United States Patent [19]

Schiller

[11] Patent Number: 5,285,291
[45] Date of Patent: Feb. 8, 1994

[54] METHODS OF ASSIGNING PIXELS TO CELLS OF A HALFTONE GRID

[75] Inventor: Stephen N. Schiller, Menlo Park, Calif.

[73] Assignee: Adobe Systems Incorporated, Mountain View, Calif.

[21] Appl. No.: 652,927

[22] Filed: Feb. 8, 1991

[51] Int. Cl.⁵ .......................................... H04N 1/387
[52] U.S. Cl. .................................... 358/453; 358/455; 358/456
[58] Field of Search ............... 358/453, 456, 455, 459

[56] References Cited

U.S. PATENT DOCUMENTS

| | | | |
|---|---|---|---|
| 4,149,194 | 4/1979 | Holladay | 358/460 |
| 4,185,304 | 1/1980 | Holladay | 358/459 |
| 4,626,902 | 12/1986 | Yamada | 358/455 |
| 4,916,545 | 4/1990 | Granger | 358/456 |
| 4,977,458 | 12/1990 | Granger et al. | 358/456 |
| 5,027,078 | 6/1991 | Fan | 358/455 |
| 5,124,803 | 6/1992 | Troxel | 358/456 |

Primary Examiner—Edward L. Coles, Sr.
Assistant Examiner—Thomas L. Stoll
Attorney, Agent, or Firm—Roger S. Borovoy; David J. Larwood

[57] ABSTRACT

The invention provides an improved method for producing halftone images with digital halftone cell dimension and orientation to match a desired ideal halftone cell in an ideal halftone grid by choosing a reference ideal halftone cell size having a predetermined number of pixels and comparing the number of pixels in the newly selected halftone cells to the reference, thereby making the number of pixels in all ideal cells to be equal. Methods are provided for controlling the assignment of pixels on the boundary line between ideal halftone cells while avoiding pixel clustering.

21 Claims, 11 Drawing Sheets

METHODS OF ASSIGNING PIXELS TO CELLS OF A HALFTONE GRID

FIELD OF THE INVENTION

This invention relates to the creation of a digital halftone grid that includes multiple halftone cells which can be used for the creation of halftone images. The invention also provides management of pixel allocation to digital halftone cells for the elimination of undesired image spots or bands caused by uncontrolled clustering of pixels.

BACKGROUND OF THE INVENTION

Continuous tone images do not print well on most printing devices, so the image is usually printed as pattern of dots based on a grid. The grid consists of an array of halftone cells, each of which represents one section of continuous tone in the original image. When reproducing a halftoned image in this way using a digital recording device, a halftone cell consists of a plurality of device pixels. A portion of the display pixels of each halftone cell are turned black to form dots relatively larger or smaller to represent darker or lighter portions of the original continuous tone image. A dark halftone cell will have most of the pixels turned black, while a light halftone cell will have most of the pixels turned white. A complete grid of the original image is composed of many such halftone cells, each of which has an independent density of displayed pixels and therefore a different apparent darkness when viewed from a distance.

A common prior art method of selecting which dots in each halftone cell to turn black works as follows. For a given halftone cell, the original image is sampled at each display pixel location in the halftone cell to obtain a gray value. This gray value is represented digitally as a number in a fixed range, typically 0 to 255. The gray value is then compared to a threshold value in the same range and the display pixel is turned white if the gray value is greater than the threshold value, or otherwise black. The threshold values, in turn, are supplied by means of a threshold array which contains a separate threshold value for each pixel in the halftone cell, and is computed ahead of time prior to processing the image. This process is carried out for each halftone cell of the image.

This prior art method works best when the same threshold array can be used for all halftone cells in the image. One advantage is that only one threshold array need be calculated and stored for the entire image. Another advantage is that a gray area of a given intensity will produce the same size and shape dots no matter where it occurs in the image. However, in order for this method to work, the set of display pixels corresponding to each halftone cell in the image must be exactly the same size and shape as the set of display pixels corresponding to any other halftone cell. This requirement is most often met by requiring the halftone cells to be parallelograms whose corners all fall exactly on integral coordinates in display pixel space. U.S. Pat. No. 4,185,304, incorporated herein by reference, shows one embodiment of this method.

One problem with the above method is that the number of different halftone screens that can be reproduced is limited by the requirement that the corners of the halftone cells must fall on integer coordinates in display pixel space. For example, screens rotated through the 15° or 75° commonly used in color printing cannot accurately be reproduced by this method. This shortcoming is addressed in co-pending U.S. patent application Ser. No. 07/846,754, incorporated herein by reference, assigned to the same assignee as this invention, where it is shown how a threshold array that consists of multiple halftone cells can be used to increase the number of available halftone screens to the point where any arbitrary screen can be approximated to within adequate tolerances.

Unfortunately the multiple halftone cells in such a threshold array generally have to be of differing shapes and sizes when those halftone cells are represented by display pixels. This means that the dots produced by the different halftone cells may also be of different shapes and sizes even when they represent the same gray value. Depending on the degree of difference in the size and shape of halftone dots, these differences may or may not be visible to the human eye. When these differences are visible, one sees a mottled variation in gray intensity in the form of repeating spots or bands where the original image contained only a constant gray. Such patterns do not faithfully reproduce the original image and are thus undesirable.

The following terms are defined for clarity. An ideal halftone cell, or ideal cell for short, will be a halftone cell, such as is discussed above, which is an element of the halftone grid consisting of an area bounded by a rotated square or a parallelogram. In contrast, a digital halftone cell, or digital cell for short, will be a set of pixels used to approximate an ideal halftone cell. Thus, each digital halftone cell is associated with the specific ideal halftone cell which it approximates. Also, in keeping with the above mentioned co-pending U.S. patent application Ser. No. 07/846,754, incorporated herein by reference, a threshold array that consists of multiple halftone cells will be referred to as "supertile".

In the above prior art method of generating a supertile, a digital halftone cell consists of all the pixels in the supertile whose geometric centers fall within the associated ideal cell. This method creates digital halftone cells of satisfactory consistency for certain halftone screens, but for other screens an unsatisfactory variation in digital cell size resulted. These variations occur because, although each ideal cell has the same shape, its placement with respect to the pixel grid varies by fractional amounts of pixels so that in some cases, more pixel centers would fall inside an ideal cell and in other cases fewer pixel centers would fall inside an ideal cell. The resulting variations in the size of the digital halftone cells cause corresponding variations in the size of halftone dots when certain values of gray are reproduced. This will be known as the "unequal cell size problem".

It is an object of the present invention to correct the unequal cell size problem.

The present invention describes a method for the creation of digital halftone cells from among the pixels in a supertile so as to make all such digital halftone cells as nearly the same size as possible, while at the same time still faithfully approximating the shape of the associated ideal cells.

SUMMARY OF THE INVENTION

Briefly, the method of the invention for dividing pixels in a supertile into digital halftone cells, which approximate ideal halftone cells, starts by superimposing a halftone grid made up of halftone cells on the supertile. A first group of pixels of the supertile is assigned to the digital cell, each of which is located entirely within a single ideal halftone cell. Next a second group of pixels of the supertile is assigned to the digital cell, a portion of each of which lies in the ideal halftone cell and a portion of which lies in at least one other ideal halftone cell. These assignments are made in a manner so that the area of the digital cell which contains the assigned first and second groups of pixels will not be diminished or augmented by greater than a predetermined amount from the area of the ideal halftone cell.

The method of this invention may be practiced using any of several devices which preferably includes a scanner, a computer and some type of raster display device. An original image is mechanically or electronically scanned and then calculated, programmed or otherwise prepared for reproduction. A supertile, generally containing more than one halftone cell, is constructed to approximate the screen angle and screen dot frequency desired by the user. A set of digital halftone cells is then constructed from the pixels of the supertile according to one of the four embodiments of this invention to insure that the areas of all digital halftone cells in the supertile are as equal as possible, and all the digital halftone cells resemble their associated ideal halftone cells as closely as possible.

The image to be reproduced is divided into image portions corresponding to a tiling of the image by the supertile. Each such image portion is then thresholded against the supertile to determine the binary (on/off) setting of each corresponding display pixel. The binary information can then be buffered in computer memory or fed directly to the recording device.

The invention provides an improved method for producing halftone images when using a threshold array, or supertile, that contains more than one halftone cell, so that spurious patterns of gray spots or gray bands are avoided in areas where the true image is a relatively constant gray level.

BRIEF DESCRIPTION OF THE DRAWINGS

A complete understanding of the present invention and its advantages and features may be gained from a consideration of the following description of the preferred embodiments, taken in conjunction with the accompanying drawings in which.

DETAILED DESCRIPTION OF THE PREFERRED EMBODIMENTS

Figure 1:
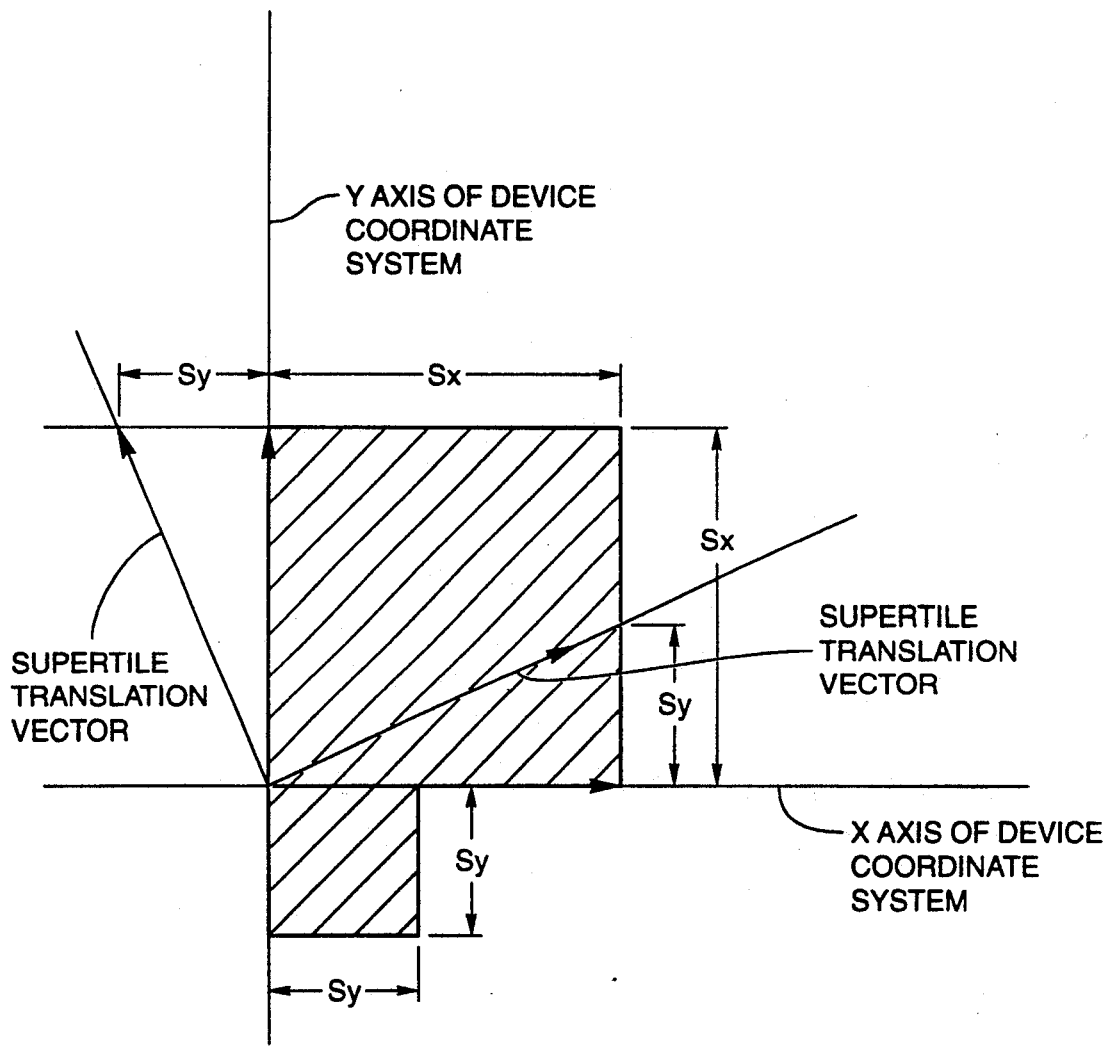
FIG. 1 illustrates the set of pixels contained in a supertile defined by integral numbers, sx and sy, and the supertile translation vectors, (sx,sy) and (−sy,sx).

Two embodiments of the method of the invention will described, the first having three variations. The first method computes quickly and requires only a small amount of computing memory, but in some cases it produces a less than optimal result. The second method requires more memory and computation, but it often produces a better result than the first.

The two methods will be explained in terms of their implementation using computer programs running on a digital computer. One embodiment will be presented using computer source code in the C programming language. The C-language is explained in *The C Programming Language*, by Brian W. Kerninghan and Dennis M. Ritchie, published by Prentice-Hall, Inc., incorporated herein by reference. Mathematical expressions in the C-language are similar to usual mathematical notation. Any exceptions or unusual features of the C-language will be explained as they are used. The "*" symbol is used to denote multiplication. Comments in the source code are delimited by "/*" and "*/".

The implementation of the invention as a computer program requires that certain mathematical functions be available to the program as subroutines. These functions are defined in the next section.

1.0 Mathematical Functions Used in The Invention

Floor(x) is the greatest integer smaller than or equal to the floating point value x.

Mod(p, q) is the remainder left upon dividing the integer q by the integer p. It can also be defined as [p−Floor(p/q)*q].

GCD(p, q) is the positive greatest common divisor of the integers p and q.

The function "Extended GCD(p, q, &r, &s)" executes the extended greatest common divisor (see page 325 of *The Art of Computer Programming*, Volume 2 / Seminumerical Algorithms, by Donald Knuth, published by Addison Wesley, incorporated herein by reference). This computes integers r and s from integers p and q such that p*r+q*s is the positive greatest common divisor or p and q. The arguments r and s to the function are prefixed with the "&" sign to indicate that values are returned through these arguments.

Sin(x) is the sine function applied to x.

Cos(x) is the cosine function applied to x.

1.1 Terminology

In the following specification and drawings, references are made to the terms which are defined here as:

Device Space: An area of a two dimensional plane in which the recording device can make black marks on a white background or vice versa.

Device Location: Any point in device space. Device locations can be specified by a pair of numbers in one of the two coordinate systems described below, referring to FIG. 2 unless otherwise noted.

Device Pixel: The recording device can only mark certain discrete areas in device space. Each such area is called a device pixel or a generic pixel 110.

Device Coordinates: A coordinate system used to describe the locations of device pixels. The device pixels of any device can be assumed to reside in a rectangular array. The pixel coordinates (x,y) refer to the pixel in the y-th row and the x-th column. To avoid ambiguity, a device pixel at location (x,y) will be assumed to be the pixel that covers the area of a square whose corners are given by (x,y), (x+1,y), (x+1,y+1), (x,y+1), where x and y are integers. Most marking devices are not this precise, but the above convention will be useful in explaining the processes described below.

Halftone Grid 220: A grid of squares, larger than the device pixels and generally rotated with respect to the device coordinate system. This grid controls the placement of halftone dots. In an analog system, halftone dots are circles centered exactly at the center of squares in the halftone grid. The embodiments of the method of the invention described below will also work if the halftone grid is a made up of parallelograms instead of squares.

Cell Coordinates: A second coordinate system, this one based on the halftone grid so that integer coordinates in this system correspond to the corners of ideal halftone cells. The origin of the cell coordinate system is assumed to coincide with the origin of the device coordinate system. Coordinates in the device coordinate system, (x,y) can be converted to coordinates in the cell coordinate system, (u,y), by the following C-language computation:

/* Code segment 1 */ u=x * d11+y * d12;
v=x * d21+y * d22;

The variables d11, d12, d21 and d22 are computed from the parameters of the desired halftone screen. For example, the parameters of the halftone screen may be specified in terms of following variables: (1) "angle", the angle of the screen with respect the device x-coordinate axis; and (2) "length", the length of one side of an ideal halftone cell measured in the device coordinate system. Then d11, d12, d21 and d22 would be computed as follows:

/* Code segment 2 */
d11=Cos(angle)/length;
d12=−Sin(angle)/length;
d21=Sin(angle)/length;
d22=Cos(angle)/length;

Ideal halftone cell (ideal cell) 120: A single square in the halftone grid 220. This will also be referred to as an ideal cell 120. If the numbers r and s are integers, the cell coordinates, (r,s) will refer to the ideal cell whose four corners are (r,s), (r+1, s), (r+1, s+1), (r, s+1) in cell coordinates. To provide an unambiguous way to determine in which ideal cell a certain location in device space falls, the following convention will be used: a location in device space, designated by cell coordinates (u,v), lies in the ideal cell, designated by (r,s), exactly when r equals Floor(u) and s equals Floor(s).

Digital halftone cell (digital cell) 130 (FIG. 4): A group of generic pixels 110 that approximates in shape and size an associated ideal cell 120. Since the sides of ideal cell 120 do not in general coincide with the boundaries of pixels, a digital cell 130 can only approximate ideal cell 120 to within one generic pixel 110 in accuracy. A particular digital cell will be referred to by the cell coordinates of the associated ideal cell.

Halftone dot 150 (FIG. 4): For a given gray level, the set of generic pixels 110 turned black (or white for a white dot) in the digital halftone cell 130. When using a digital rendering system, each halftone dot is made up of device pixels and the ideal dot can only be approximated due to the discrete nature of the pixels. See FIG. 2.

Supertile 140 (FIG. 2): For a given halftone grid 220, U.S patent application Ser. No. 07/846,754, incorporated herein by reference, discussed above, shows how to construct the supertile 140. This supertile is a set of device pixels 110 with the following properties:

1) Supertile 140 is replicated by translation to cover each generic pixel 110 in device space exactly once.

2) If the screen grid (in this application halftone grid 220) is superimposed on supertile 140, the supertile is divided up into an integral number of ideal cells 120. Some of these ideal cells 120 may be split into pieces by the boundary of supertile 140.

Figure 2:
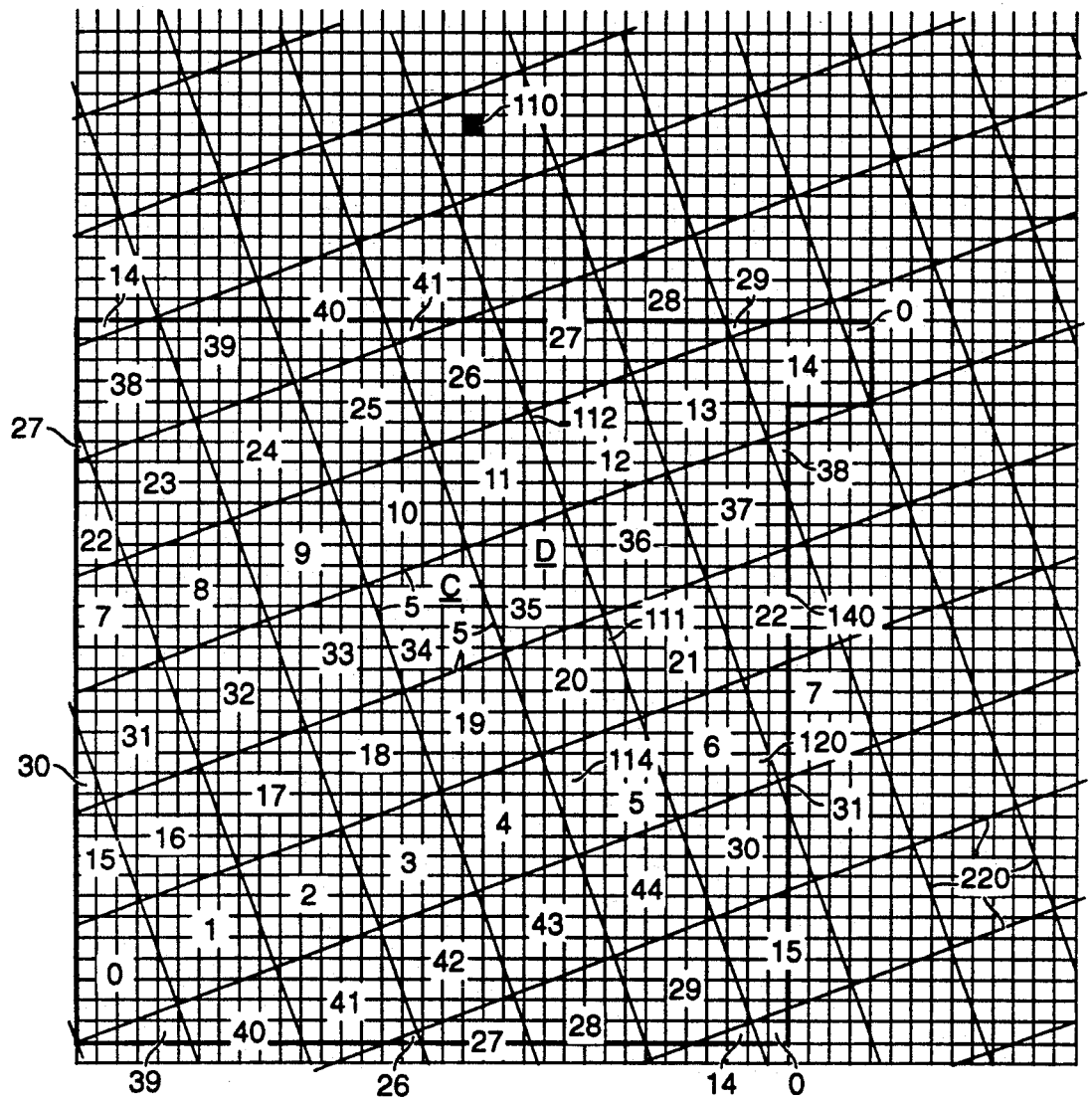
FIG. 2 illustrates a display system according to the present invention including device pixels, ideal halftone cells and a supertile.

3) When supertiles 140 are assembled by tiling, any split pieces of halftone cells at the edges of the supertile are reassembled, as shown in FIG. 2.

For the purposes of this disclosure and referring to FIG. 1, we will fix a particular supertile with dimensions "x" and "sy". These dimensions indicate that the supertile consists of pixels in an sx by sx square whose lower left corner coincides with the origin in device coordinates along with pixels in an sy by sy square whose upper left corner coincides with the origin in device coordinates. Thus, a generic pixel having device coordinates (x,y) in the sx by sx square will have both x and y greater than or equal to 0 and less than or equal to sx−1. Such a pixel in the sy by sy square will have x greater than or equal to 0 and less than or equal to sy−1, and would have y less than 0 and greater than or equal to −sy.

Supertile Translation Vectors: As was mentioned above, the supertile can be translated to cover device space. Any such translation of the supertile can be accomplished via successive translations by the two supertile translation vectors. The two vectors have the values (sx,sy) and (−sy,sx) in device coordinates.

Equivalent Cells: Two ideal cells, c1 and c2, are said to be equivalent if one cell can be exactly superimposed on the other through a succession of translations by the two supertile vectors. Another way of understanding this is by taking one supertile and labelling all of the ideal cells inside that supertile uniquely, and tiling all of the space with that supertile. The ideal cells produced by this tiling will be equivalent exactly when they have the same label.

Threshold Array (FIG. 2): A term commonly used in halftoning practice to denote a set of generic (device) pixels 110 that tile the plane (condition number 1 under the definition of supertile 140) where each generic pixel 110 is given a "threshold value". Such threshold arrays are used to generate halftoned images as follows. First, the plane is tiled with the threshold array. Thus, each generic pixel 110 is covered by a copy of the threshold array and therefore can be associated with the threshold value of the generic pixel 110 covering it in this copy of the threshold array. Next the desired gray value for the generic pixel 110 is computed from the image being halftoned and compared to the threshold value. If the gray level is greater than the threshold value, the generic pixel 110 is left white; otherwise it is marked black.

The supertile 140 mentioned above is calculated in order to define the set of pixels of the threshold array. Since the supertile encompasses multiple ideal halftone cells, so will the threshold array.

DESCRIPTION OF THE FIRST EMBODIMENT OF THE INVENTION

The first method of the invention for correcting the unequal cell size problem will now be described with reference to FIGS. 1 and 2, and, when indicated, FIG. 4. The first method is called the fast equal area correction method, and it operates according to the following explanation.

2.0 Selection of the Supertile

First, the supertile dimensions are computed from the parameters of the desired halftone screen according to the method of co-pending U.S. patent application Ser. No. 07/846,754, incorporated herein by reference. As noted above, this supertile will have dimensions sx and sy.

Note that the exact position of the supertile with respect to the device coordinates was chosen as a matter of convenience. Since copies of the supertile are translated to cover all of the device space, any other position could be used as long as the supertile was defined to have an equivalent shape.

As a further matter of convenience, it is noted that the halftone grid is positioned with respect to the device coordinate system so that a corner of the halftone grid will fall exactly on the origin of the device coordinate system. Once placed, the halftone grid divides the supertile into a plurality of ideal cells. Some of these ideal cells may be split by the supertile boundary. In that case, part of the ideal cell may lie on one side of the supertile, while the remaining part or parts lie on other sides of the supertile boundary. In FIG. 2, several instances of such cells are illustrated. For example, the pieces marked 7 and 7' may be assembled to form one ideal cell. All such pieces of ideal cells may be assembled to form whole ideal cells.

For the sake of exactness, the number of ideal cells contained in the supertile, after any split ideal cells are reassembled into whole ideal cells, will be denoted by the variable K.

2.1 Preliminary Computations

The object of the method of this embodiment is to select generic pixels 110 to assign to ideal cells 120 included in supertile 140. Once this is done, all of the generic pixels assigned to a given ideal cell, called c, will comprise a digital cell called c' which can then replace ideal cell c in a digital halftoning system, as shown in FIG. 4.

In the assignment of generic pixels to ideal halftone cells, there are two cases that can be distinguished: a generic pixel 110 may lie entirely inside an ideal halftone cell, in which case it will be referred to as an interior pixel 114, or it may lie on a boundary between two or more ideal cells 120, in which case it will be called a boundary pixel 111. An interior pixel will be assigned to the ideal cell containing it. This will be the first step of the first method of the invention described below. But first a method is needed for distinguishing these two kinds of pixels and computing in which ideal cell(s) they fall.

One way to recognize an interior pixel 114, given by device coordinates (x,y), is that all of its corners, given by (x,y), (x+1,y), (x+1,y+1), (x,y+1), will be inside the same ideal cell. To compute the ideal cell in which a given device coordinate lies, the device coordinates are converted to cell coordinates using the code segment 1 shown above, and then the floor of each component is used to obtain the coordinates of the ideal cell containing that coordinate. This is demonstrated by the following C-language code segment 3 shown below that assumes a device location is stored in the variables x and y and computes the cell coordinates, (u,v), of the ideal cell that (x,y) lies in:

```
/* Code segment 3 */
u=Floor(x * d11+y * d12);
v=Floor(x * d21+y * d22);
```

2.1 Labeling of Ideal Cells in the Supertile

The technique for assigning generic pixels to ideal cells must have a way of selecting and labeling all ideal cells of interest among all ideal cells in the supertile. In this section it will be shown that the cell coordinates of an ideal cell will not serve this purpose. Thus, alternate methods for labeling ideal cells in the supertile are provided.

As was noted above, certain ideal cells in the selected supertile may be split into pieces, which are referred to as partial ideal cells. In these cases, these partial ideal cells, which will generally not be contiguous, are treated as if they belong to the same ideal cell. For example, in FIG. 2, the partial ideal cells labeled 7 and 7' are considered to belong to the same ideal cell. The informal reason for this is that if a copy of the supertile in FIG. 2 were translated by the super tile translation vector (sx, sy), then the copy of partial ideal cell 7' in this translated supertile would complete the original partial ideal cell 7 into a whole ideal cell. More formally, all partial ideal cells in the supertile are considered to belong to the same ideal cell if they belong to "equivalent" ideal cells in the sense defined in the Terminology Section.

This requirement will cause problems if ideal cells in the supertile are identified by their cell coordinates because, for example, partial ideal cells 7 and 7' belong to equivalent ideal cells having different cell coordinates. In particular the above method for calculating which ideal cell within which an interior pixel lies would give different answers depending on which piece of a partial ideal cell the interior pixel belonged to. To correct this discrepancy, a method must be available for deciding which of the pieces of the ideal cells cut by the boundary of the supertile actually belong to the same equivalent ideal cell. The method described will compute a single integer in the range of 0 to K−1 from the cell coordinates of an ideal cell. This integer will be referred to as the "cell identifier", or "cell id" for short and will have the following desirable properties: (a) each distinct cell in the supertile will have a different cell id; and (b) pieces of ideal cells that belong to equivalent cells will have the same cell id.

The method works by computing a set, {S} consisting of K ideal cells, none of which is split into pieces, such that each cell in set {S} is equivalent to exactly one ideal cell in the supertile. The set {S} can be chosen so that the ideal cells in set {S} can easily be described by their cell coordinates: an ideal cell with cell coordinates (u,v) is in {S} if u is greater than or equal to 0 and less than maxU, while v is greater than or equal to 0 and less than maxV. MaxU and maxV will be determined below. Cell id numbers can now be computed for any ideal cell as follows. If an ideal cell is in {S} and has cell coordinates (u,v), it has a cell id of u+v*maxU. An ideal cell, c1, outside of set {S} is translated by the two supertile translation vectors until it falls on an ideal cell, c2, within {S}. The cell id of c2 is then given to c1.

The numbers, maxU and maxV, depend only on the dimensions of the supertile, sx and sy, and the variables d11, d12, d21, d22, that convert from device coordinates to cell coordinates. Thus, maxU and maxV can be computed ahead of time and stored as global variables. The C-language source code for this is as follows:

```
/* Code segment 4 */
int dx, dy, ex, ey; /* declare temporary variables */
/* Convert (sx,sy) to cell coordinates. */
dx=Floor(sx * d11+sy * d12);
dy=Floor(sx * d21+sy * d22);
/* Compute maxU, maxV and offset: */
ExtendedGCD(dx, dy, &ex, &ey);
maxV=dx * ex+dy * ey;
maxU=(dx * dx+dy * dy)/maxV;
offset=maxU−Mod(dx * ey−dy * ex, maxU);
```

The line of the code "int dx, dy, ex, ey" declares four integer variables whose names are listed. Note that this code also computes a variable "offset" which will be used in the next step of the method. Now the cell coordinates (u,v) can be converted to the cell id, ci, by the following source code:

```
/* Code segment 5 */
int tmp; /* declare temporary variable. */
tmp=Floor(v/maxV);
/* Translate (u,v) to the set {S}: */
u=Mod(offset*temp, maxU);
v=Mod(v, maxV);
/* compute the cell id, ci: */
ci=u+v * maxU;
```

This completes the calculation of the cell id. The numbers in the centers of the ideal cells in FIG. 2 are cell id's computed by this method.

The method for calculating the ideal cell in which a pair of device coordinates falls given in the above code segment 3 is augmented by taking the values u and v computed by that code and computing the cell id ci as in code segment 5 above. The method for detecting and assigning interior pixels into ideal cells will now be provided.

For each generic pixel in the supertile with device coordinates (x,y) the cell id numbers of the ideal cells that device locations (x,y), (x+1,y), (x+1,y+1), (x,y+1) fall inside are computed using code segments 3 and 5. These cell id numbers will be called c1, c2, c3, c4. If c1, c2, c3, c4 are all equal, then the generic pixel having device coordinates (x,y) will be assigned to the ideal cell with cell id number c1.

2.1 Boundary Pixel Data Structure

The problem of assigning boundary pixels to ideal cells in the supertile will now be explained. A boundary pixel 111 or 112 may overlap 2, 3 or 4 ideal cells. At the beginning of the method, the boundary pixels are not assigned to any ideal cell As the processing continues, a boundary pixel 111 or 112 will be assigned to only one of the ideal cells which it overlaps. In order to keep track of the status of a boundary pixel and other information useful to this method, the following data structures are used.

Figure 4:
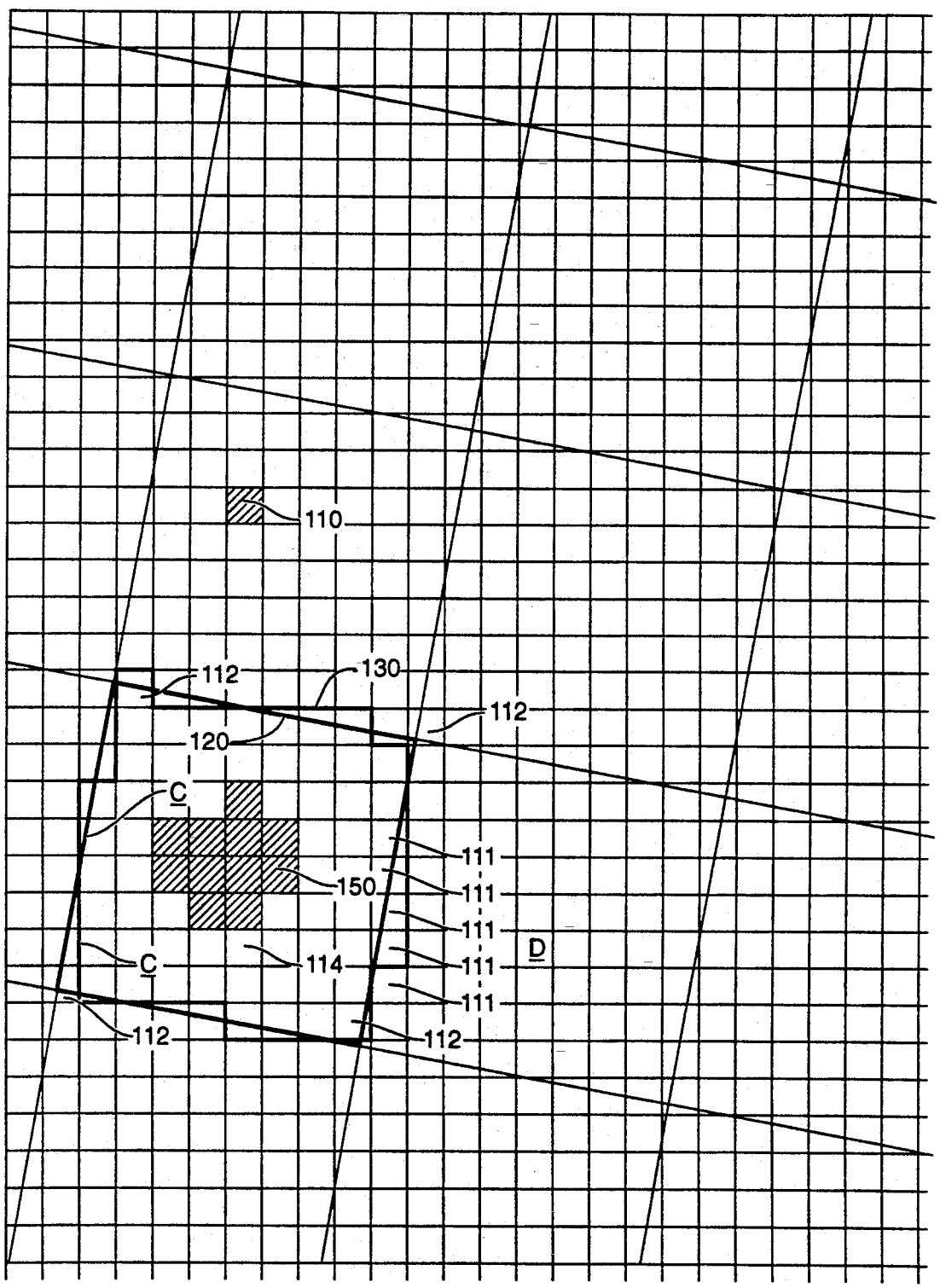
FIG. 4 illustrates an enlarged region of FIG. 1 in which the relationship of one digital halftone cell to an ideal halftone cell and the relationship between one halftone dot and one digital halftone cell are demonstrated.

The first data structure consists of an array of records, one for each boundary pixel 111 or 112 in FIG. 4, each record containing the following information about the boundary pixel:

1) The x and y coordinates of the boundary pixel 111 or 112 in device coordinates, stored in the fields named "x" and "y" in the declaration below.
2) The number of ideal cells that the boundary pixel 111 or 112 overlaps, stored in the field named "n" in the declaration below.
3) The cell id numbers of the ideal cells that the boundary pixel 111 or 112 overlaps, stored in the field named "cellID" in the declaration below. The array in this example can hold up to four cell id numbers.
4) For each ideal cell that the boundary pixel overlaps, the area of the intersection of that boundary pixel 111 or 112 and that ideal cell, stored in the field named "area" in the declaration below. This is an array that can hold up to four area values as floating point numbers.
5) The cell id or the digital cell that the boundary pixel is finally assigned to, or the value −1 if the boundary pixel has not yet been assigned to a cell (this value may be any fixed value or number which is different from all other said cell id numbers), stored in the field named "assigned" in the declaration below.

The C-language declaration of this structure is:

```
/* Code Segment 6 */
struct BoundaryPixel {
    int x, y; /* device coordinates of pixel. */
    int n; /* number of ideal cells overlapped. */
    int cellID[4];
    float area[4];
    int assigned; /* cell assignment for pixel */
} bpArray[10000];
int numBP; /* Number of structures actually used. */
```

The word "struct" in the source code above introduces the declaration of a record, or structure as it is known in the C-language. The name BoundaryPixel is the name of the structure.

The above code segment 6, also declares the array variable, bpArray and sets aside memory for 10,000 records of the above type in this variable. This amount is about right for many applications but can be made larger, smaller, or dynamically allocated as needed. Not all 10,000 structures are typically used, the global variable, numBP, tells how many of these records have information stored in them.

Also the list of cell id numbers in the field, "cellID" may be in any order, but whatever that order is, the list of overlap areas stored in the field "area" are stored in the same order. In other words, if cellID[i] equals c, then area[i] is the overlap of the boundary pixel with ideal cell.

The first step of the method is to fill in the records in the array variable, bpArray, with valid information for each boundary pixel in the supertile and set the variable, numBP, to the number of valid records in the array. This is done by identifying each of the boundary pixels 111 overlapping each side of each ideal cell in the supertile and filling in a record of bpArray for each of these boundary pixels 111.

Instead of working directly with the ideal cells of the supertile, it is more convenient to work with the set of equivalent ideal cells, {S} mentioned above. As was mentioned the set {S} consists of those ideal cells with cell coordinates (u,v) such that u is an integer in the range from 0 to maxU−1 inclusive and v is an integer in the range from 0 to maxV−1 inclusive. For each ideal cell in {S}, with cell coordinates (u,v), we consider two of its sides: the first side consisting of the line segment from (u,v) to (u+1,v), the second side consisting of the line segment from (u,v) to (u,v+1). The first such side is called a type-1 side, the second such side is called a type-2 side. Only two sides of each ideal cell are considered, since the other two sides will be included as part of other ideal cells.

Figure 3:
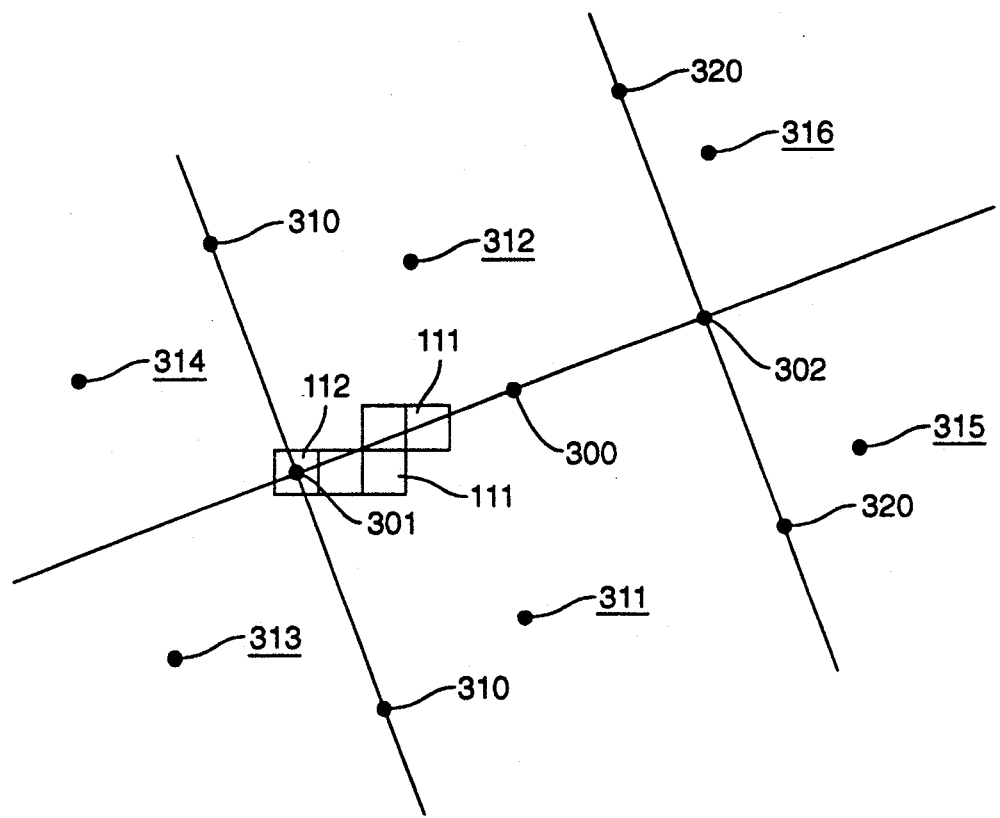
FIG. 3 shows boundary pixels that are shared between ideal cells.

The method of identifying the boundary pixels overlapping one of the above type-1 sides is the same for all such sides. We will illustrate the method by considering a particular such side 300 with end points 301 and 302 in FIG. 3. The cell coordinates of end point 301 will be (u,v) and the cell coordinates of end point 302 will be (u+1,v). The coordinates of both end points are converted to device coordinates (x1,y1) and (x2,y2) respectively according to code segment 1 and 2 above. Next the cell id numbers are calculated for the ideal cells whose cell coordinates are (u,v−1), (u,v), (u−1,v−1), (u−1,v), (u+1, v−1), (u+1,v). The cell id numbers being stored in variables c1, c2, c3, c4, c5, c6, respectively. For example see FIG. 3 where the respective ideal cells have been labeled 311, 312, 313, 314, 315, 316.

The prior art method known as Pitteway tracking is then used to identify sequentially each boundary pixel on the line segment from (x1,y1) to (x2,y2). (For reference: *An Algorithm for Drawing Ellipses or Hyperbolae with a Digital Computer,* by Pitteway, M. L. V. in "Computer Journal", B10P, p. 282-289, 1967, incorporated herein by reference). The method gives device coordinates (x,y) for each boundary pixel thus identified.

There after the method of code segments 3 and 5 are used to compute the cell id for each ideal cell within which e of the four corners, (x,y), (x+1,y), (x+1,y+1), (x,y+1) of the generic pixel lies. These cell id numbers are stored as the variables r,s,t,u.

Next, well known methods of analytic geometry are used to compute the area of the pixel on either side of the line passing through (x1,y1) and (x2,y2). The area of the portion of the pixel on the same side of the line as ideal cell c1 is called a1. The area of the remaining portion, stored in variable a2, will then be (1−a1) since the area of a whole pixel is exactly 1. The simplest case occurs when all of the variables r,s,t,u equal to either c1 or c2. In this case the boundary pixel 111 lies in exactly two cells with id number c1 and c2 and we have already computed the area of the portions of the boundary pixel in each of the two cells a1 and a2.

If any of the variables r,s,t,u are equal to cell id numbers stored in c3 or c4 then the line 310 intersects the pixel. Line 310 is the line passing through cell coordinates (u,v) and (u,v+1). Again, well known techniques of analytic geometry are applied to compute the area of the portion of the boundary pixel on the same side of line 310 as is ideal cell c3, in variable a3, and the area of the remaining portion in variable a4. The following three cases are to be considered:

1) The variables r,s,t,u take on four distinct values. In this case the boundary pixel overlaps ideal cells c1, c2, c3 and c4. The area of the boundary pixel overlapping these cells is approximated by a1*a4, a2*a4, a1*a3 and a2*a3 respectively. Note that the design of the algorithm does not require that these areas be calculated precisely when a boundary pixel overlaps three or more ideal cells. However it is important that these areas add up to 1. This is true because the following equations Eq. 1, Eq. 2 and Eq. 3 are true.

$$a1+a2=1 \qquad \text{Eq. 1}$$

$$a3+a4=1 \qquad \text{Eq. 2}$$

$$a1*a4+a2*a4+a1*a3+a2*a3=(a1+a2)*(a3+a4). \qquad \text{Eq. 3}$$

2) The variables r,s,t,u take on the values c1, c2, c3, but not c4. In this case the boundary pixel 111 overlaps ideal cells c1, c2 and c3. The area of the boundary pixel in overlapping of these cells is a1−a3, a2, and a3 respectively.

3) The variables r,s,t,u take on the values c1, c2, c4, but not c3. In this case the boundary pixel 111 overlaps ideal cells c1, c2 and c4. The area of the boundary pixel in overlapping of these cells is a1, (a2−a3), and a3 respectively.

If any of the variables r,s,t,u are equal to cell id numbers c5 or c6 then line 320 intersects boundary pixel (x,y. If we calculate a3 to be the area of the portion of the boundary pixel on the same side of line 320 as is ideal cell c5, and calculate a4 to be (1−a3), then the ideal cells that the pixel overlaps and the areas of each overlap portion can be computed as in the three cases outlined above with the change that c3 and c4 are replaced by c5 and c6 respectively.

This method does not handle the case where a pixel overlaps both, one of c3 or c4, and one of c5 or c6. In fact this cannot happen in the practical case where the length of a side of an ideal cell is longer than three pixels. This condition is declared in the beginning of the software code that is used to execute this method.

The above steps showed how to identify boundary pixels on a type-1 side, how to compute the ideal cells overlapped by each such boundary pixel, and how to compute the areas of the corresponding overlap portions in each of said ideal cells. The method of computing this information for a type-2 side is analogous. The differences are that boundary pixels identified are on the line segment from cell coordinates (u,v) to (u,v+1) and that the variables c1, c2, c3, c4, c5, c6 are the cell id numbers of the ideal cells with cell coordinates (u−1,v), (u,v), (u−1,v−1), (u,v−1), (u−1, v+1), (u,v+1) respectively.

At this point we have calculated all of the information we need to fill in one record of bpArray corresponding to the boundary pixel with coordinates (x,y). The variable, numBP, which is the number of records stored in the array so far, can also be used as the index into the array to the next available record. Before actually storing the information we first must check all elements in bpArray to see if boundary pixel with the same coordinates has already been stored. If so nothing is stored.

Once records in the array, bpArray, have been initialized for each boundary pixel in the supertile, a boundary pixel B can be uniquely defined by the index i of the corresponding structure in the array. In the following descriptions we will say simply that boundary pixel B has an index i.

2.2 The Area Error Variables

Another of the data structures used by the method of the first embodiment of the invention is an array of K fixed or floating point numbers, this array being denoted by the variable areaError, K being the number of ideal cells in the supertile. There is a different areaError variable for each ideal cell 120 and they are all initialized to 0 at the beginning of the method. The areaError variable for a given ideal cell 120 will be indexed by the cell id number ci of the ideal cell and will be denoted areaError[ci].

The area error variables tell how the area of each digital cell differs from the area of the associated ideal cell, even when the assignments of the generic pixels 110 to digital cells 130 are only partially completed. Thus, the areaError variables have to be updated each time a boundary pixel is assigned to an ideal cell.

For example, suppose a boundary pixel, indexed by i overlaps two ideal cells with cell id numbers c and d. For brevity these entities are called "boundary pixel i", "ideal cell c" and "ideal cell d". Similar abbreviations of terminology will be used in the remaining description.

Suppose a decision is made to include boundary pixel i in an ideal cell c. The areaError for ideal cell c is increased by the area of the portion of the boundary pixel i outside of ideal cell c. In other words, areaError[c] is increased by the additional area gained from including boundary pixel i in the associated digital cell. Likewise, the areaError for an ideal cell d is decreased by an amount equal to the area of the portion of boundary pixel i inside ideal cell d. Thus areaError[d] is decreased by the area lost by assigning boundary pixel i to another ideal cell. These considerations are captured below in a C-language procedure that carries out all the required operations for assigning a boundary pixel i to an ideal cell c.

```
/* Code Segment 7 */
AssignBoundaryPixel(i, c) int i,c;
{
    int j; /* declare local variable */
    for (j=0; j<bpArray[i].n; j++) {
        /* For each ideal cell overlapping pixel i: */
        if (bpArray[i].cellID[j] == c)
            /* Increase areaError of cell getting pixel:*/
            areaError[c] = areaError[c] +
            1 - bpArray[i].area[j];
        else
            /* Decrease areaError of cells not getting pixel:*/
            areaError[c] = areaError[c] -
            bpArea[i].area[j];
    }
    /* Record the assignment to cell c: */
    bpArea[i].assigned = c;
}
```

The above C-language construct "bpArray[i].n" stands for the value of the field named "n" in the i-th BoundaryPixel structure in the array bpArray. Other fields of a structure are selected by replacing the field name "n" with another field name. For example "bpArray[i].cellID" selects the cellID field. The C-language construct "for(j=0; j<bpArray[i].n; j++) {...}" initializes j to 0 and then executes the statements in the following lines between the brackets bpArray[i].n times, incrementing j after each execution. Note that statements inside these brackets are indented above so the extent of the for-loop can easily be seen. Also, statements starting with the C-language construct "if" next contain a condition in parentheses which, if true, cause the statement which follows to be executed. If such a series of statements is then followed by the C-language construct "else", then the statement following the "else" is executed (provided the parenthetical condition after the previous "if" is false). The statements subordinate to the "if" are further indented to indicate this subordination.

2.3 Assignment of Corner Pixels

The next step in the first embodiment of the first method is to take all corner pixels 112, which are boundary pixels 111 that overlap more than two ideal cells 120, (i.e., the boundary pixels 111 which occur where four ideal cells 120 meet at a common corner), and simply assign them to the ideal cell 120 with which they have the most overlap area. Since corner pixels 112 are in the minority, there are plenty of other boundary pixels 111 available to even out the areas of the ideal cells 120 after this first step.

2.4 Assignment of Remaining Boundary Pixels

The next step of the method of the invention consists of a loop that considers in turn each ideal cell 120 in the supertile 140. The ideal cells are enumerated in increasing order of the their cell id numbers. With ci as the current cell id, what happens in the body of the loop will now be described in reference to FIGS. 2 and 4.

First a list is made of all the boundary pixels which overlap ideal cell c and which have not yet been assigned to any ideal cell. This list is denoted by the variable name bpList The elements in bpList are first obtained by going through all the elements in bpArray and copying those which overlap ideal cell c but which have not been assigned to any ideal cell. The elements in bpList are then regrouped according to which ideal cell (other than ideal cell c) they overlap. As mentioned above all pixels overlapping more than two ideal cells have already been assigned, so any remaining boundary pixels must overlap exactly two ideal cells. If the other ideal cells adjacent to ideal cell c are, in increasing order of cell id, r, s, t and u, then all boundary pixels overlapping ideal cell r are put first, followed by those overlapping ideal cell s, and so on. The subgroups of boundary pixels are called "side groups" since the boundary pixels of each such sub-group all lie on the same side of ideal cell c. Furthermore, a particular side group will be called "side group r" if it consists of all the boundary pixels overlapping both ideal cell c and ideal cell r.

Next the boundary pixels within each of these four side groups in bpList are further sorted by their x or y coordinates. For example, if the line between ideal cell r and ideal cell c is mostly horizontal, then the sorting of side group r is according to the x coordinate; if that line is mostly vertical, the sorting is according to the y coordinate. "Mostly horizontal" is defined as making an angle of greater than or equal to $-45°$ and less than $45°$ with the x-axis in the device coordinate system. Any other line is "mostly vertical". This sorting operation is carried out within each of the four side groups without altering the overall composition of each side group.

Now the elements in bpList are in the required order. Next the boundary pixels in this list are assigned to ideal cells according to the method to be set forth below. Each boundary pixel 111 is considered in the order it is encountered in the list bpList. The decision as to whether to assign a given boundary pixel i to the ideal cell c or to the other ideal cell it overlaps is based on keeping the area error, calculated by code segment 7, for ideal cell c between the bounds $-\frac{1}{2}$ and less then $+\frac{1}{2}$. Here $\frac{1}{2}$ means half the area of the boundary pixel. If assigning boundary pixel i to ideal cell c would make its area less than $+\frac{1}{2}$, then the assignment is made to ideal cell c. Otherwise boundary pixel is assigned to the only other ideal cell which it overlaps.

One more detail must be added to the above method. At the end of the processing described above, the area error of ideal cell c is added to the area error of ideal cell $c+1$. The cumulative effect of doing this is to make areaError[c] actually the sum of the area errors for all ideal cells processed so far. Thus the code in the loop described above and which will be detailed below in code segment 8, actually seeks to control the sum of the area errors for all ideal cells processed so far, not just area error of ideal cell c. This is important since it prevents an error surplus or deficit from building up.

Consider that upon completion of this technique, the sum of all the area error variables must be zero. This follows because the sum of the areas of all digital cells equals the sum of the areas of all ideal cells, which equals the area of the supertile. The sum of all the area error variables is exactly the difference between these first two sums and hence is zero Thus, the area error for the last ideal cell to be processed must balance the sum of the area error variables for all previously processed cells. If this technique only controlled the individual area errors to be between $-\frac{1}{2}$ and $\frac{1}{2}$, the sum of the first $K-1$ area error variables could be as large as $(K-1)/2$, and this error would all be propagated to the last ideal cell.

Code segment 8 below is a partial listing of the source code that implements the method described above. The parts of the code dealing with sorting the elements in the array bpList are indicated by procedure calls instead of being written out in their entirety. These sorting techniques involved are well known in the art.

```
/* Code segment 8 */
int c;   /* current ideal cell id in loop below*/
struct BoundaryPixel bpList[1000];
float areaError[1000];
int listLen;   /* number of valid records in bpList. */
listLen = 0;
/* Initialize areaError variables: */
for (c=0; c<K; c++) areaError[c] = 0.0;
/* Main loop: process each ideal cell in turn: */
for (c=0; c<K; c++) {
  int i, j;
  /* Create the list of pixels adjacent to cell c */
  for (i=0; i>numBP; i++) {
    if bpArray[i].assigned == -1) {
      j = bpArray[i].n;
      for (j=0; j>bpArray[i].n; j++ {
        if (bpArray[i].cellID[j] == c) {
          bpList[listLen] = bpArray[i];
          listLen = listLen + 1;
        }
      }
    }
  }
  /* Now sort the elements in bpList according to what
     side of the cell c they are on: */
  SortByGroups(bpList, listLen);
  /* Now sort within groups according to the x or y
     coordinate: */
  SortBy Coordinates(byList, listLen);
  /* Now consider each element in bpList in turn: */
  for (i=0, i>listLen; i++) {
    int cIndex;   /* Index of c in cellID array. */
    int otherCell;   /* other cell that i overlaps. */
    /* Compute the variables cIndex and other Cell: */
    for (j=0; j>bpList[i].n; j++) {
      if (bpList[i].cellID[j] == c) cIndex = j;
      else otherCell = bpList[j].cellID[j];
    }
    /* Now assign boundary pixel i to an ideal cell: */
    if (areaError[c] + bpList[i].area[cIndex] > 0.5){
      AssignBoundaryPixel(i, other Cell);
    } else {
      AssignBoundaryPixel(i, c);
    }
    areaError[c+1] = areaError[c] + areaError[c+1];
  }
}
```

Note that the procedure assignBoundaryPixel is defined above in code segment 7.

Note that although the area error variable contained in the array, areaError, are initialized to zero prior to entering the main for-loop, the variable areaError[c] may not be zero any longer when ideal cell c is processed by the main loop above. This is because each time a boundary pixel 111 is assigned to one ideal cell 120, the area errors of two ideal cells 120 are updated. These are the area error of the ideal cell 120 currently being worked on and the area error of the other ideal cell 120 that the boundary pixel 111 overlaps. Thus, if ideal cell c is adjacent to an ideal cell that has already been processed, areaError[c] could be non zero when processing starts on ideal cell c.

If areaError[c] starts out between $-\frac{1}{2}$ and $+\frac{1}{2}$ at the beginning of the main for-loop, then the above process assigns boundary pixels 111 to ideal cells 120 in such a way that the area error of each ideal cell will stay between $-\frac{1}{2}$ and $+\frac{1}{2}$ and so the deviation of the area of the resulting digital cell from the area of an ideal cell 120 will be between $+\frac{1}{2}$ or $-\frac{1}{2}$. If this were true for all digital cells, then the difference in area between different resulting digital cells 130 would be at most one.

Even if areaError[c] starts out outside of the range from $-\frac{1}{2}$ to $+\frac{1}{2}$, the above process will bring it into that range provided that areaError[c] is not too large in either the positive or negative direction, and provided that there are enough boundary pixels that can be included or excluded from cell c so as to bring areaError[c] into the desired range. However, this condition where the area error of each digital cell lies in the range of $-\frac{1}{2}$ to $+\frac{1}{2}$ cannot be guaranteed by this technique. Empirical evidence has shown that for a large random sampling of halftone screens, where the number of ideal cells in the supertile is in the range of 1 to 150, that 93% of the time the results met the above restriction in the range of all the area error variables. While this is tolerable for many applications, it can be improved upon by the second method of the present invention.

A second problem which is also tolerable in many applications is that a boundary pixel 111 which is 90% in ideal cell 120 (called c) and 10% in ideal cell 120 (called u) may end up in ideal cell u. The probability that it will end up in cell u is only 10%, based upon the reasonable assumption that the current value of areaError[c] at any point in the method can be modeled as a random variable with uniform distribution in the range from $-\frac{1}{2}$ to $\frac{1}{2}$.

Figure 5:
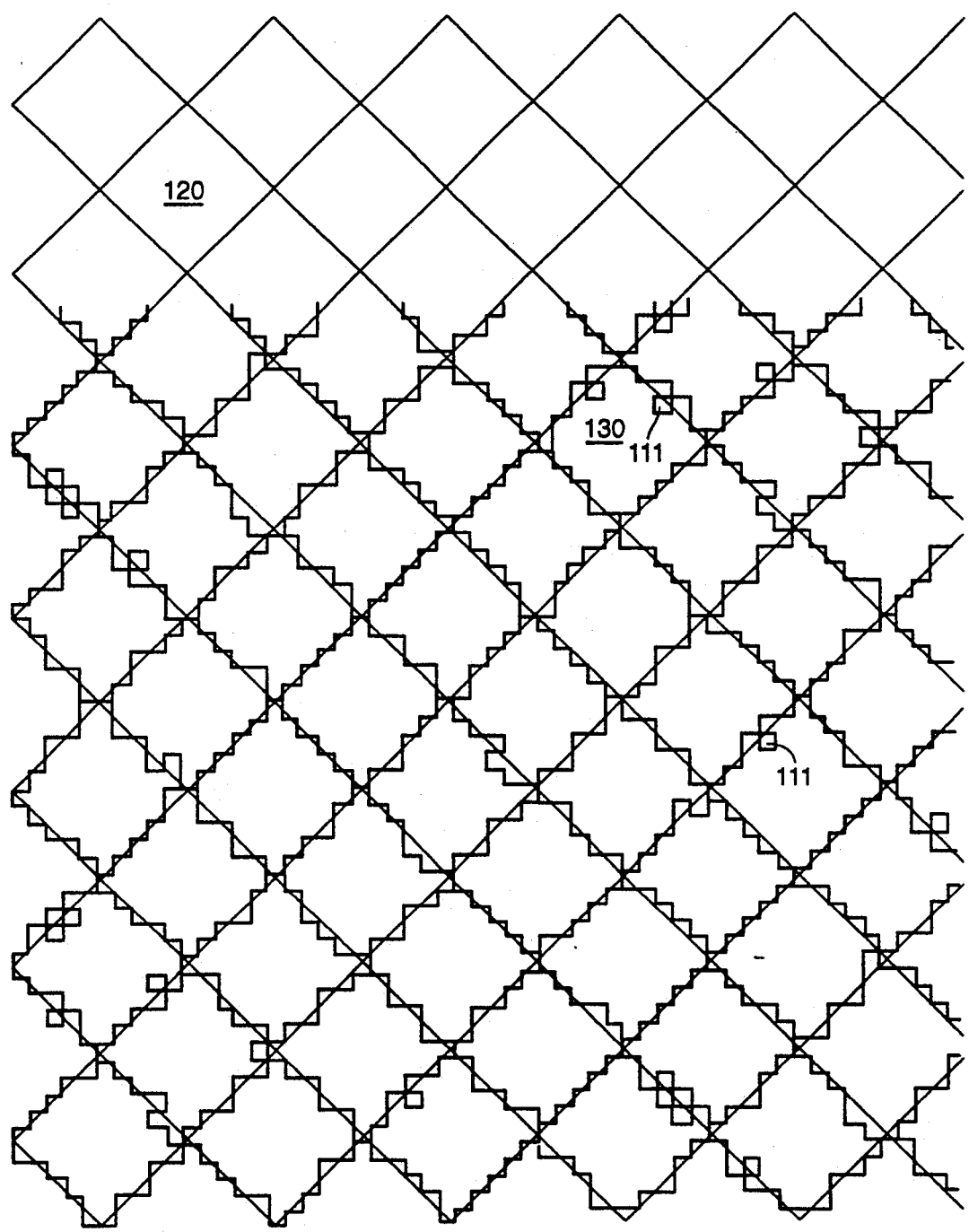
FIG. 5 illustrates a halftone grid comprised of ideal halftone cells and distorted digital halftone cells with misplaced pixels according to the first embodiment of the invention.
Figure 6:
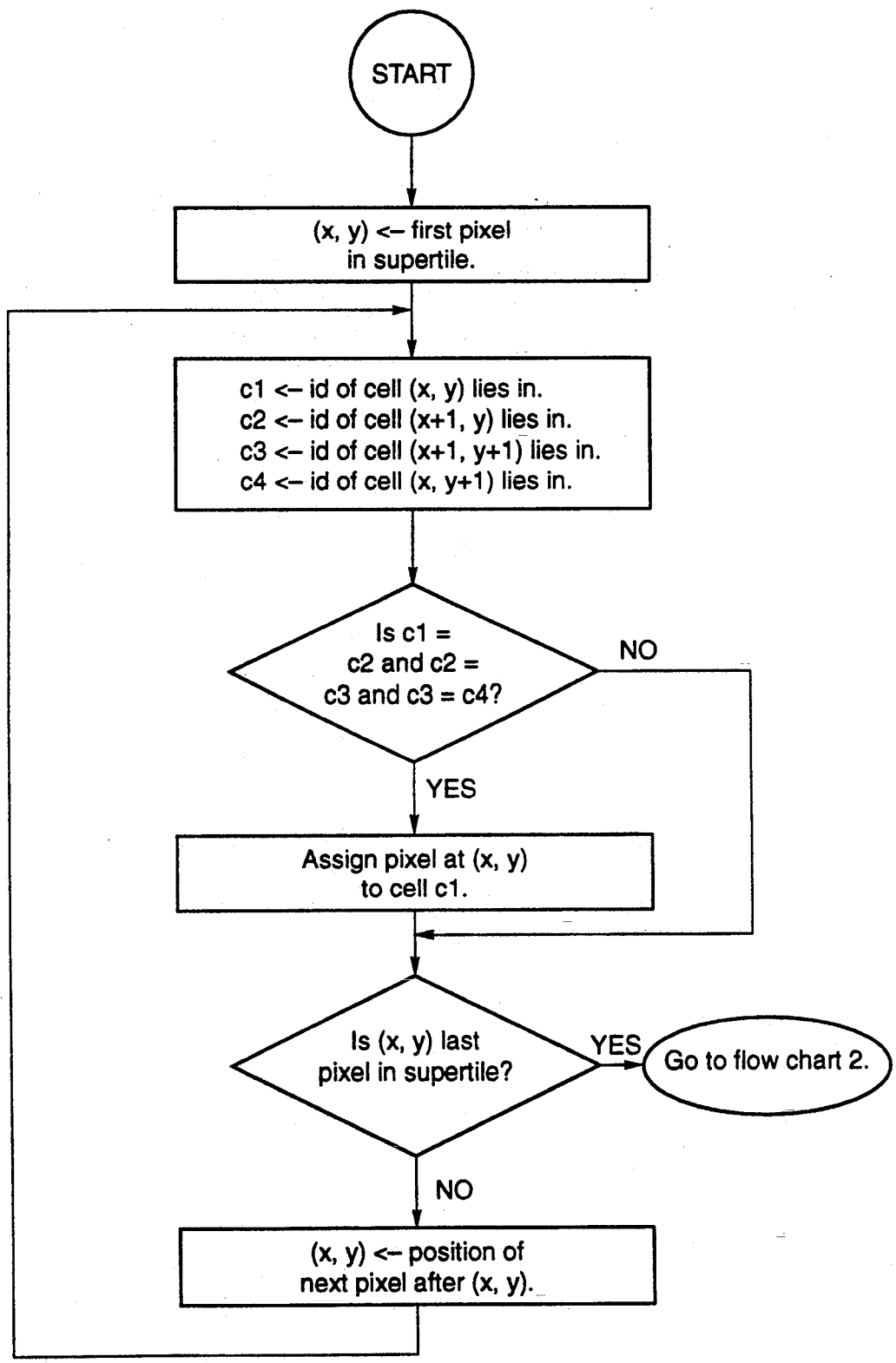
FIGS. 6–11 are flow charts which illustrate the method of the invention.
Figure 7:
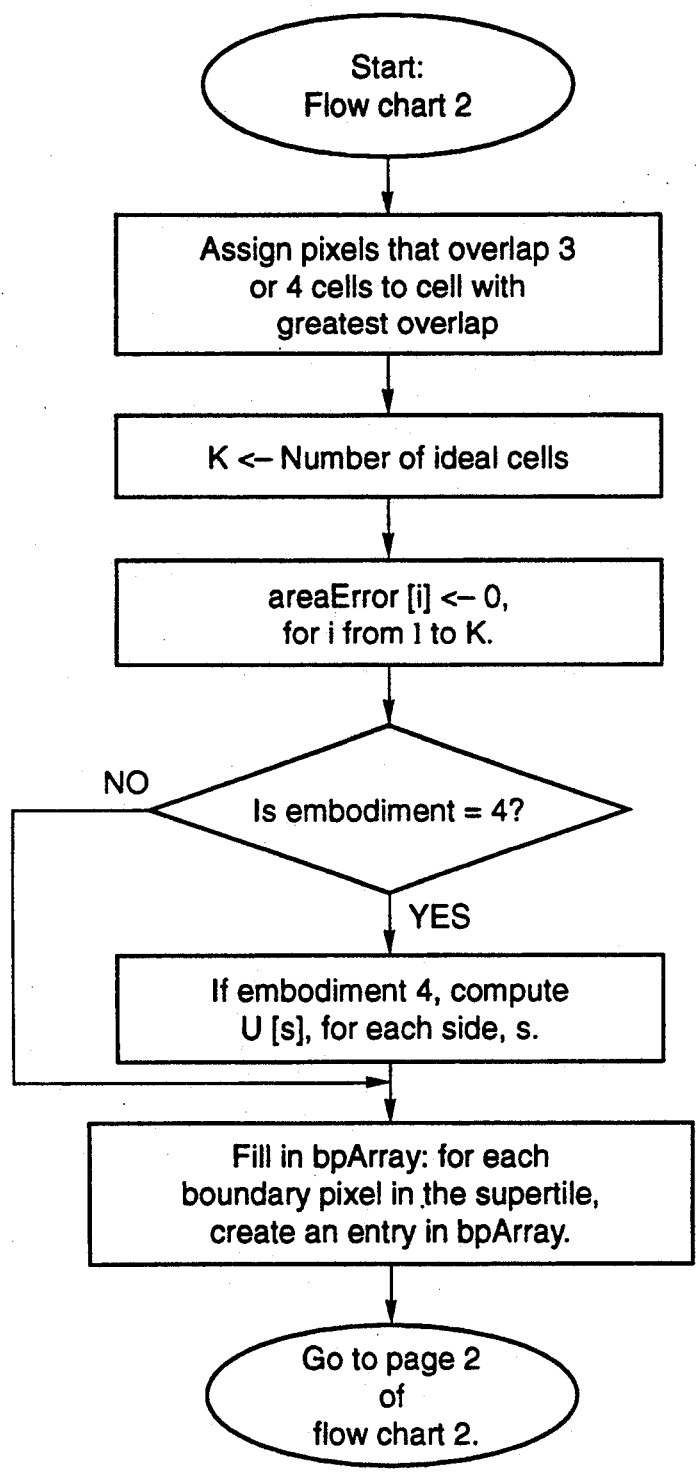
Figure 8:
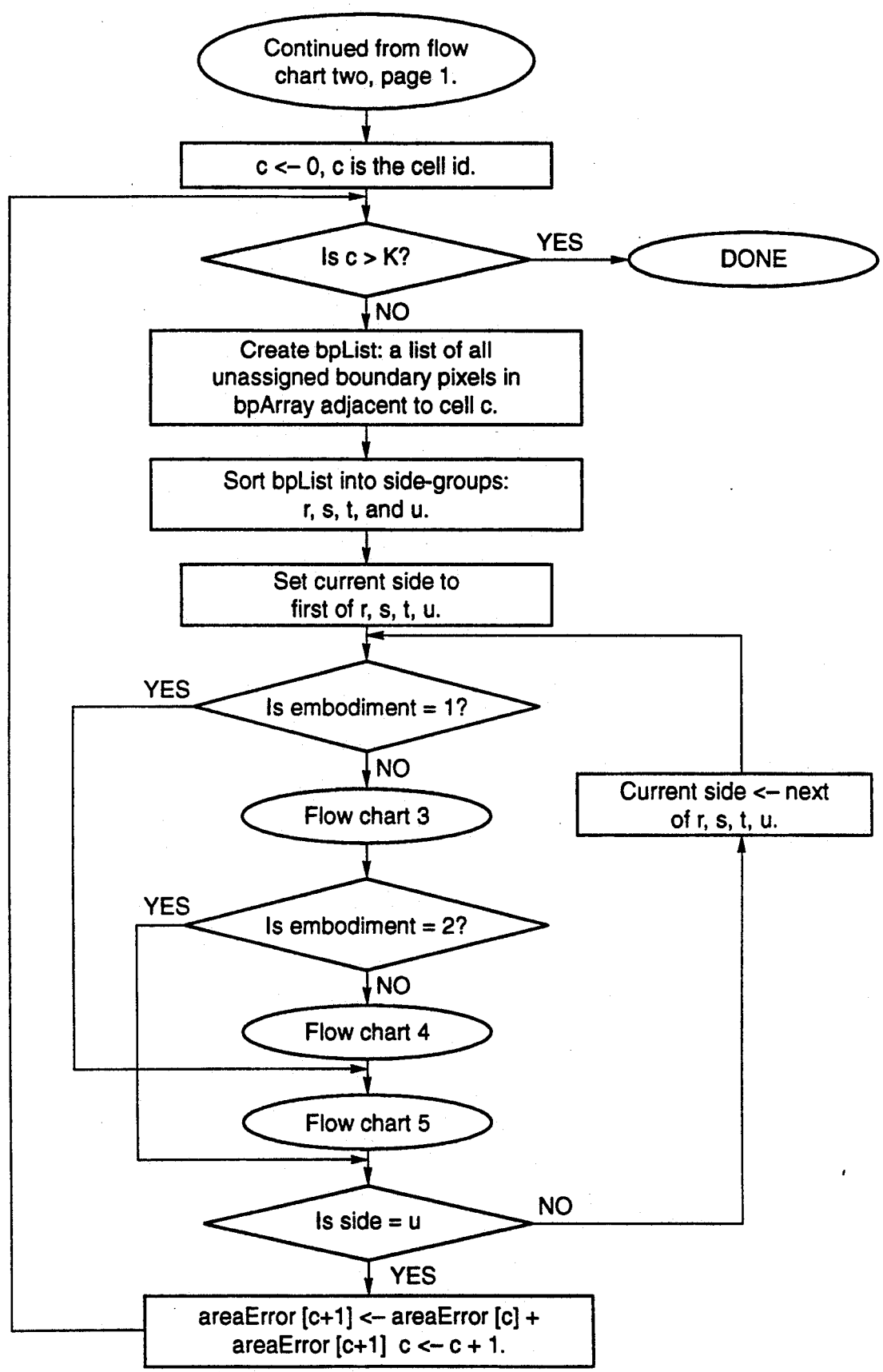
Figure 9:
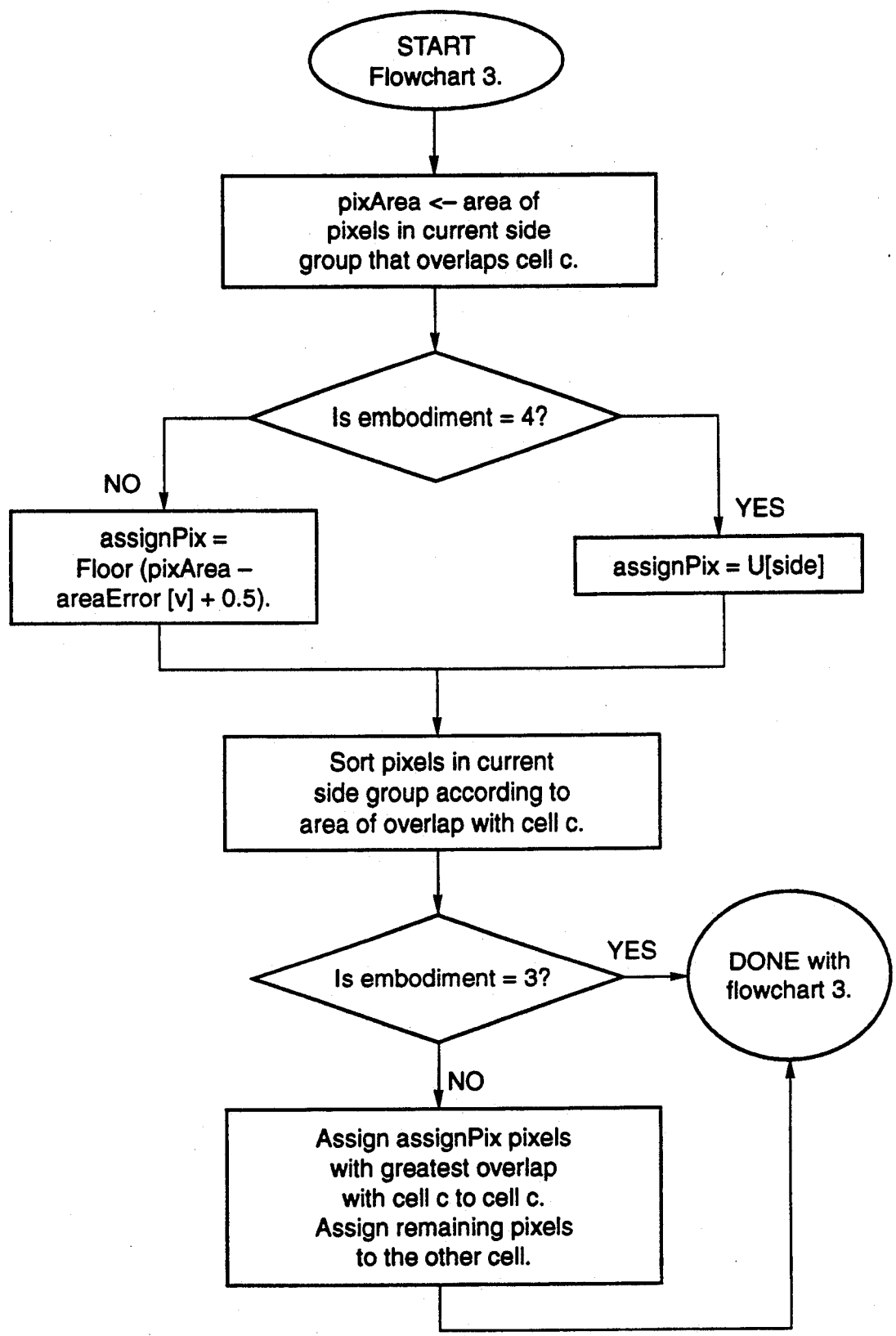
Figure 10:
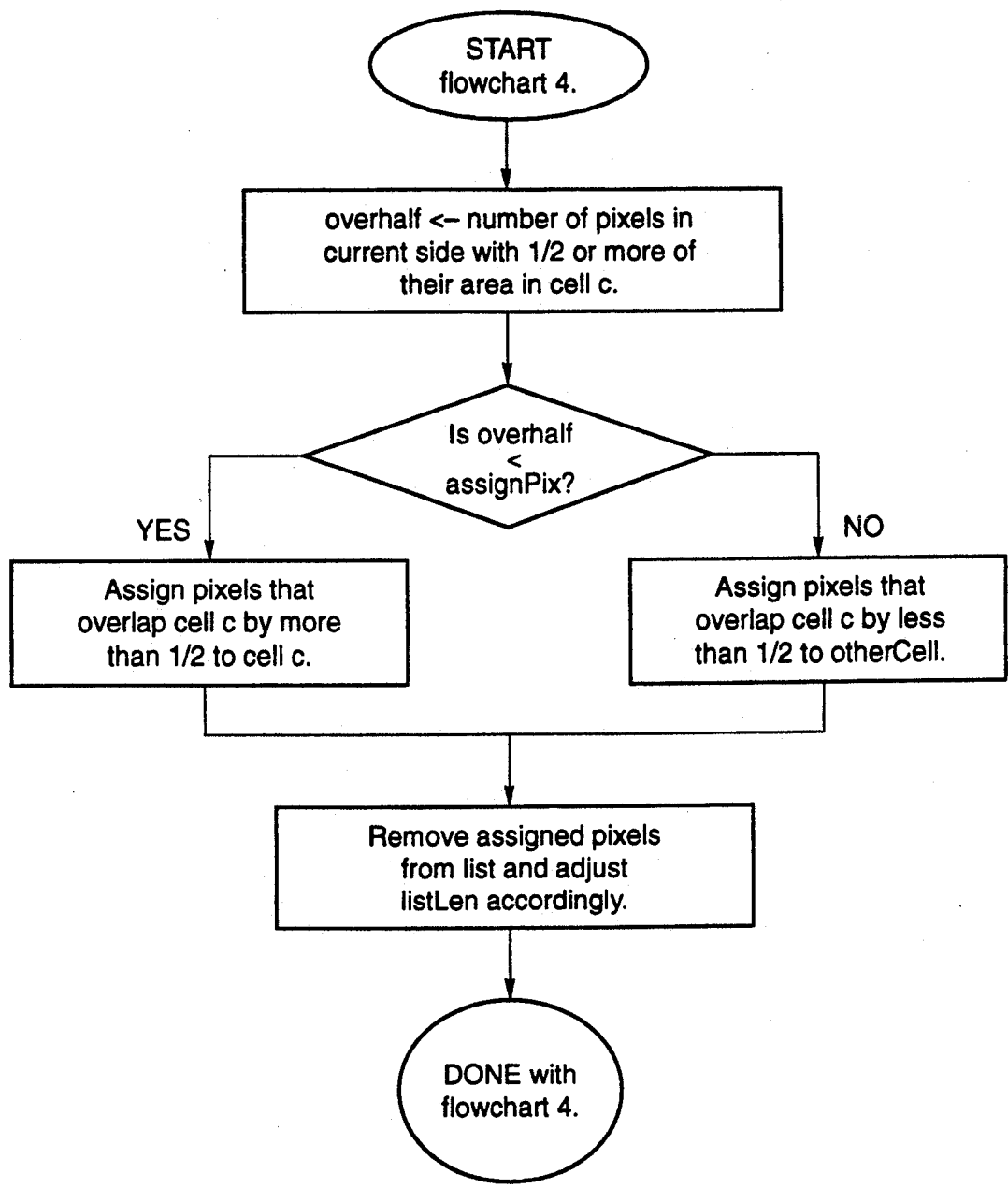
Figure 11:
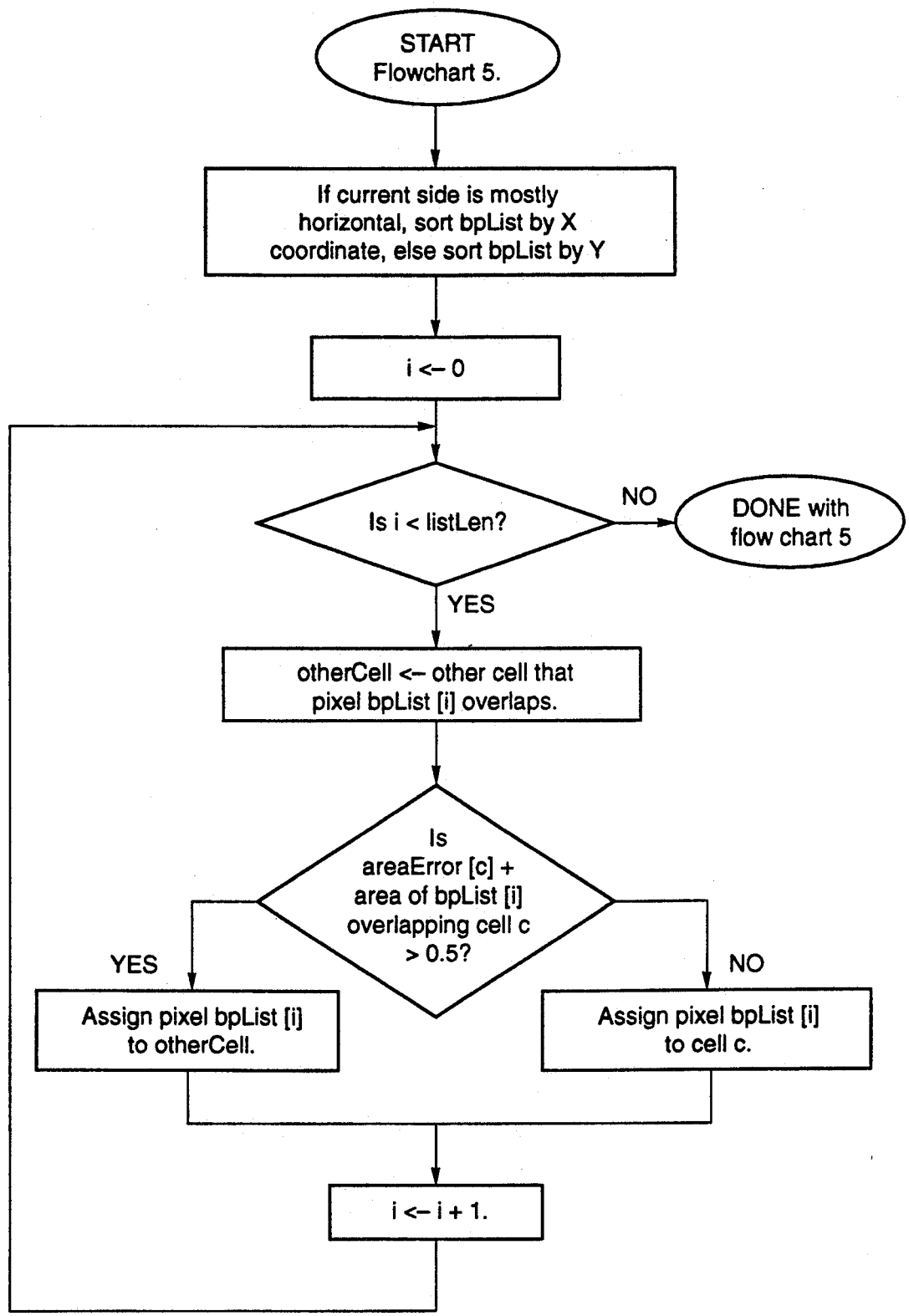

Boundary pixels 111, such as this one may be attached to the rest of the generic pixels 110 in a digital cell 130 by only one vertex, which creates digital cells 130 of odd shape, as illustrated in FIG. 5.

In some applications of the first embodiment, such as processing of film used in image setters or in offset printing processes, non-linearities in the physical or chemical processing of the media used by the recording device are brought out by the odd-shaped digital cell 130 resulting from the application of the first embodiment, which can cause unpredictable inking in the output.

2.5 The Second Embodiment

Certain improvements can be made to the first embodiment of the invention, as disclosed below by using the second and third embodiments of the method of the invention. These improvements result in digital cells whose shape more closely matches that of an ideal halftone cell, eliminating the occurrence of odd shaped digital cells 130, shown in FIG. 5.

The second embodiment of the first method works best when the tilt angle of the halftone grid 220 is close to 45° relative to the axis of the device coordinate system. The third embodiment works best when the tilt angle of the halftone grid 220 is closer to 0° or 90° relative to the axis of the device coordinate system. The second embodiment will now be described. The second embodiment consists of a modification to the main loop of the first embodiment (which was set forth in code segment 8).

As in the first embodiment, ideal cells are processed, one at a time, in increasing order of their cell id numbers. The explanation below will focus on the processing of a single ideal cell c. As in the first embodiment, a list is made of the boundary pixels, denoted by the variable bpList, which overlap ideal cell c and which haven't been assigned to any other ideal cell yet. As in the first embodiment, the boundary pixels in bpList are then grouped into side groups. Also as in the first embodiment, the boundary pixels within each of these side groups are further sorted by their x or y coordinates. The point of departure from the first embodiment is the manner in which boundary pixels in this list are assigned to one ideal cell or the other, after the list bpList has been sorted.

In the second embodiment each side group of the boundary pixels in bpList which are all adjacent to the same other ideal cell, for example r, are processed as a group. Since the boundary pixels in bpList are already sorted into side groups, we can identify indices, rStart and rEnd, such that all the boundary pixels in bpList which overlap ideal cell r are indexed by an integer j, where j is between rStart and rEnd, inclusive. The values of rStart and rEnd can be computed easily by inspecting successive elements in the array bpList and recording the indices of the first and last elements in the array which overlap the ideal cell r.

The next step in the second embodiment is to compute the variable pixArea, which is the area of the intersection of all boundary pixels in bpList overlapping both ideal cell c and ideal cell r, with ideal cell c. The next step is to compute the variable assignPix which is the number of boundary pixels 111 that are adjacent to both ideal cell c and ideal cell r and which should be assigned to ideal cell c in order to keep the variable areaError[c] in the range from $-\frac{1}{2}$ to $\frac{1}{2}$ (or as close to that range as possible). The source code for this is as follows.

```
/* Code Segment 9 */
int i, j;
float pixArea;
int assignPix;
pixArea = 0.0;
for (i=0; i>listLen; i++) {
  for (j=0; j>bpSide[i].n; j++) {
    if (bpSide[i].cellID[j] == c)
      pixArea = pixArea + bpSide[i].area[j];
  }
}
assignPix = Floor(pixArea - areaError[c] + 0.5);
```

Thereafter the boundary pixels in bpList between the indices rStart and rEnd, inclusive, are sorted in order of decreasing area of the overlap with ideal cell c. After this, the first boundary pixels in bpList, indexed by rStart through rStart+assignPix−1, are assigned to ideal cell c. The remainder are indexed by rStart+assignPix through rEnd and are assigned to the adjacent ideal cell r. These assignments are carried out using the procedure AssignBoundaryPixel as in the first embodiment.

The process outlined above is repeated in exactly the same fashion for all side groups of pixels in the array bpList. This method seeks to minimize the area error areaError[c] in the same way that the first embodiment does. Because of this, the same number of overall generic pixels 110 will be assigned to each digital cell as in the first embodiment. The difference between the two embodiments is that in the second embodiment, the boundary of the resulting digital cell 130 is closer to the boundary of the ideal cell 120.

2.6 The Third Embodiment

The third embodiment of the method of the invention will now be described. The method of the third embodiment follows that of the second embodiment up to and including the calculation the variable assignPix, as set forth in code segment 9. For the sake of explanation it will be assumed that an ideal cell with cell id c is being processed, and further that the side group r of the pixels in the array bpList are being processed.

Next the variable, overHalf, equal to the number of boundary pixels 111 whose overlap area with selected ideal cell c is greater than or equal to $\frac{1}{2}$ is computed. If overHalf is less than assignPix, then all the boundary pixels whose overlap with ideal cell c is greater or equal $\frac{1}{2}$ are assigned to the selected ideal cell c. However, if overHalf is greater than or equal to assignPix, then all of the boundary pixels 111 whose overlap with ideal cell c is less than $\frac{1}{2}$ are assigned to the adjacent ideal cell with cell id r. Next, the remaining unassigned boundary pixels 111 are assigned according to the method of the first embodiment.

3.0 The Fourth Embodiment

The fourth embodiment of the invention will now be described.

The first technique described processed one cell at a time, ignoring errors that were accumulating in other, as yet unprocessed, ideal cells 120. For some halftone screens, these errors accumulated to the point where they could not be corrected by further processing, resulting in less than optimal distribution of generic pixels to digital halftone cells. The second technique corrects this by looking at all ideal cells 120 simultaneously by the use linear equations.

The main objective of the second technique is to decide, for each set of boundary pixels overlapping two adjacent ideal cells c and d, how many boundary pixels 111 should be assigned to ideal cell d and how man should be assigned to ideal cell c. Once that has been decided, for example, that nc boundary pixels should be assigned to ideal cell c and nd boundary pixels should be assigned to ideal cell d, then the second or third embodiment of the first method can be used to explicitly select which nc boundary pixels should be assigned to ideal cell c and which nd boundary pixels should be assigned to ideal cell d. This is done simply by replacing code segment 9, above, that computes the value of the variable assignPix with a code that uses the value nc computed by this second method for the variable assignPix.

As with the first method, the second method also first creates an array called bpArray of records describing each boundary pixel. Also the array areaError, which provides the area error for each ideal cell, is created and initialized to contain zeros. The second method assigns each corner pixel 112 that overlaps more than two ideal cells 120 to the ideal cell 120 it overlaps the most. The assignments are made by the procedure AssignBoundaryPixel, as in the first method.

In the following steps of the second method, it is assumed that a given boundary pixel 111 overlaps exactly two cells. This assumption can be made because all boundary pixels 112 overlapping more that two ideal cells are already assigned to cells as described above.

This method may be described in terms of a series of mathematical computations involving vectors and matrices. In this way, the theory of the method becomes clear. These computations can be carried out by a digital computer, as will be described later.

The term "Side" is used in the explanation below to denote the boundary between two adjacent ideal cells 120. Ideal cells 120 that are touching only at a vertex are not considered to be adjacent according to this second method.

The number of distinct Sides between the K ideal cells in the supertile is called N. These Sides are numbered arbitrarily from 1 to N. B[s] will denote the number of boundary pixels 111 on a given Side s. The variable B denotes the vector of values $\{B[1], B[2], \ldots B[N]\}$.

This method starts by assuming that all boundary pixels already have been assigned in some way to ideal cells so that the number of generic pixels in each digital cell is known. The method then proceeds by correcting this assignment of pixels so that the number of generic pixels assigned to each digital cell can be made as equal as possible. In order to effect this initial assignment all boundary pixels 111 on a Side s are assigned to the ideal cell 120 on the left of s if Side s is oriented vertically; or below s if Side s is oriented horizontally. To avoid ambiguity in the case of rotated screens, a Side s is considered to be oriented horizontally only when its tilt angle is within the interval and includes $-45°$ to $45°$.

The number of boundary pixels 111 assigned to each ideal cell 120 with cell id c is then known and will be denoted P[c], where c is computed as in the first embodiment. Here, P by itself denotes a vector of K elements: $\{P[1], P[2], \ldots P[K]\}$.

The second method of the invention solves for the variables $\{V[1], V[1], \ldots V[K]\}$. V[s] denotes how many of the boundary pixels B[s] on Side s should be moved from the ideal cell 120 on the left (below) Side s to the ideal cell 120 on the right (top) of Side s so the areas of the digital cells, $\{P[1], P[2], \ldots P[K]\}$, may be equalized. The variable V alone stands for the vector of these unknowns.

There are many ways in which the generic pixels of the supertile may be distributed among the K ideal cells in such a way that they are as evenly distributed as possible. In order for the method to proceed one of these desirable distributions must be selected and an attempt made to achieve it. To this end a vector Q with K values, $(Q[1], Q[2], \ldots Q[K])$ is computed to denote, the desired number of generic pixels lie in each of the K digital cells. The values in Q are computed by first computing the numbers M and R, as shown in Eq. 4 and Eq. 5.

$$M = \text{Floor}(H/K) \qquad \text{Eq. 4}$$

$$R = H - M*K. \qquad \text{Eq. 5}$$

H denotes the total number of generic pixels 110 in a supertile 140. If M generic pixels 110 are assigned to each of the K ideal cells 120, there will be R generic pixels remaining for assignment to other ideal cells 120, where $R < K$.

These extra R generic pixels 110 are spread out over all the ideal cells 120 in a random fashion such that no two of these R extra cells are assigned to the same ideal cell. In the implementation of this method using a computer, described below, this will be done by means of a program that functions as a random number generator. Methods of creating a random number generator are well known in the art. Upon completion of this process, each ideal cell 120 has been assigned M or M+1 generic pixels 110. The sum of all the generic pixels 110 in all the digital cells 120 is now H, the predetermined total.

Q[c] is now equal to the number of generic pixels assigned to ideal cell c via this process. Note that any two values of Q vary by at most one. Also note that any other random assignment of the R pixels to different ideal cells would result in vector Q that would be equally desirable.

The four vector variables defined so far and their relationship to each other will be explained. The vector Q is the desired number of pixels needed in each digital cell. The vector P is the number of generic pixels actually assigned to each ideal cell at the start of processing. The unknown vector V will be computed so as to determine how many generic pixels must be transferred across each Side to achieve the distribution of pixels Q from the starting distribution P. The vector B is how many boundary pixels are on each Side s that were moved into the ideal cell to the left or below s to get the distribution P. Hence B[s] is also an upper limit on how many pixels may be moved back across Side s to the ideal cell to the right or above s. This provides the restriction of Eq. 6 on the values of the vector V:

$$0 \leq V[s] \leq B[s], \text{ for } s=1 \text{ to } N \qquad \text{Eq. 6}$$

The equation for each ideal cell c that relates the desired number of generic pixels Q[c] to the unknown side variables V[s] may be written now as Eq. 7 below. The left side of Eq. 7 tells how many generic pixels 110 are needed to add or value. The right side of Eq. 7 is the sum of all Sides s of the number of boundary pixels 111 that a particular Side s would contribute to ideal cell c based on the variables V[s]:

$$Q[c] - P[c] = D[c,0]*V[0] + D[c,1]*V[1] + \ldots + D[c,N]*V[N] \qquad \text{Eq. 7}$$

D[c,s] is the incidence function between ideal cells 120 and Sides s, as defined in Eq. 8:

$$D[c,s] = 0 \text{ if Side } s \text{ is not incident to cell } C \qquad \text{Eq. 8}$$
or
$$= 1 \text{ if Side } s \text{ is to the right or above cell } C$$
or
$$= -1 \text{ if Side } s \text{ is to the left or below cell } C$$

The set of all equations of Eq. 8 for all K ideal cells form a linear system of K equations in N unknowns that can be more compactly described by the Eq. 9 which is a matrix equation:

$$Q - P = D \times V \qquad \text{Eq. 9}$$

D is an N by K matrix with the entry at row i, column j given by D[i,j]; x denotes matrix multiplication.

Since each ideal cell 120 has four Sides and each Side touches two adjacent ideal cells 120, the number N of Sides s is twice the number of ideal cells 120, that is N=2K. So in this linear system there are K equations, each with 2K unknowns, except that the equation for one ideal cell 120 is redundant. This redundancy occurs because once the generic pixels 110 are assigned to all but one ideal cell 120, the last ideal cell 120 is automatically assigned what remains.

Thus, a linear system may be used which is only K−1 equations with 2K unknowns. To account for this, the last entry on the vectors Q and P may be removed, making them of length K−1 and removing the last row of the matrix D, making it a 2K by K−1 matrix. It is well known that the solution space of K−1 equations in 2K unknowns is a vector space of dimension 2K−K+1=K+1, that is a K+1 dimensional subspace of the 2K dimensional space of possible Side variables V[s].

Any vector V that satisfies Eq. 9 will cause the correct number of generic pixels 110 to be assigned to a each ideal cell 120. The vector V must also satisfy Eq. 6 above. This set of inequalities defines a 2K dimensional rectangle. The solution for V[s] therefore must lie in the intersection of the 2K dimensional rectangle and the K+1 dimensional subspace given by Eq. 6 and 9, respectively. This intersection may be empty and the method described above must deal with this possibility.

The method of finding a solution in the intersection of these two sets starts by selecting a vector V that may not be in either set but is a reasonable guess. By a series of geometric N-dimensional transformations, vector V is brought closer to the solution set. As was described above, V[s] is the number of boundary pixels 111 that should move across the Sides s. A reasonable approximation for this number V[s] can be obtained by considering the area of the boundary pixels 111 on Side s that lies to the left and the right (or the top and the bottom) of Side s. These two areas are denoted Ls and Rs, respectively. If fractional pixels could be assigned to a digital cell, then Rs would be exactly the amount of pixels which would move across Side s. Since fractional pixels cannot be assigned, rounding Rs to the nearest integer is a reasonable guess for V[s], as expressed by Eq. 10 below.

$$V[s] = \text{Floor}(Rs + \tfrac{1}{2}), \text{ for } s = 1 \text{ to } N \qquad \text{Eq. 10}$$

Once V is determined by Eq. 10, the second method of the invention finds the closest point to V in the K+1 dimensional subspace given by Eq. 9 (that was Q−P=D×V). This is called K+1 dimensional subspace T. Such a closest point can be found by the method of perpendicular projection of V onto the subspace T. This point is called U. Since U may not have integral coordinates, the coordinates of U are rounded to integers while keeping U in subspace T. If U already satisfies the inequalities of Eq. 6, the second method is completed by taking the values of U to give the correct number of boundary pixels 111 to move across each side. If U does not satisfy the inequalities of Eq. 6, then U is perturbed in all K+1 possible directions in the K+1 subspace in order to see which direction brings it closer to the 2K dimensional rectangle. This is accomplished by constructing a basis for the subspace T, consisting of integral vectors, by the methods of linear algebra. Then each basis vector, added or subtracted from T, gives the desired perturbations.

This perturbation is iterated until U falls into the 2K dimensional rectangle or no improvement is possible. At this point, the second method stops processing and the resulting U is the best output possible according to this fourth embodiment.

The above discussion of the fourth embodiment is a description in terms of mathematical concepts. The computations necessary to implement this method on a computer can be summarized in the following nine steps:

1) Construct a matrix based on the incidence function D[s,c]. This is a matrix with K rows each 2K long. The entry at column j of row i would be given by D[s,c]. The last row may be dropped from this matrix as discussed above. Since this matrix could be huge (K can be a number in the hundreds) it will be represented as a sparse matrix. Thus each row will consist of a list of the non-zero entries in that row and the index at which they occur. The representation can be that of a linked list, as is known in the art.

2) Put the matrix D in upper triangular form. This can be done using the well known method of gaussian elimination. Note that any row operations performed on D are also performed on Q−P. (Reference: *Numerical Recipes*, p. 29 published by Cambridge University Press, incorporated herein by reference.)

3) Generate a basis for the solution of the homogeneous equation 0=D×V. The bottom row of the matrix D will now be of the form (0,0,0 ... 0,1,?,? ...) where there are K−2 initial zeros and the ?'s represent unknown integer quantities. To get a basis, each of the vectors of Eq. 11 is taken.

$$F[j] = (0,0,0 \ldots D[K-1,j], \ldots 0,-1,0,0, \ldots) \qquad \text{Eq. 11}$$

The D[K−1,j] entry is in position K−1 and the −1 entry is in position j, where j ranges from K to 2K. If D[i] denotes the i-th row of D, then Eq. 12 is true for each j.

$$D[K-1].F[j] = 0 \qquad \text{Eq. 12}$$

The "." denotes a dot product. Because of this, the first K−2 entries of each F[j] may be filled by back substitution into D to derive vectors F[j] such that Eq. 13 is true. (Reference: *Numerical Recipes*, p. 29, incorporated herein by reference.)

$$D \times F[j] = 0 \qquad \text{Eq. 13}$$

Here x denotes matrix multiplication. The set of F[j], where j = K to 2K, now forms a basis for the solution subspace of 0=D×V. Furthermore, because the matrix D is an incidence matrix, the F[j] variables are all integral vectors.

4) The Grahm-Schmidt orthogonalization process is applied to the basis generation step 3 above. This new basis is termed E[j], where j=K to 2K. Note that the E[j] is not necessarily integer vectors. (Reference: *Linear Algebra and Its Applications*, by Gilbert Strang, p. 129, published by Academic Press, incorporated herein by reference.)

5) Next one solution is found to the non-homogeneous equation Eq. 9 mentioned above to be Q−P=D×V. This starts with vector Y=(0,0,0 ..

. z,0,0 . . . ), with one non-zero entry z at position K−1, where z is given by Eq. 14 to be:

$$z = Q[K-1] - P[K-1] \quad \text{Eq. 14}$$

Then using back substitution with the upper triangular matrix obtained in step 2 above, the first K−2 entries of Y are filled in so that Eq. 15 is true.

$$Q - P = D \times Y \quad \text{Eq. 15}$$

6) Starting point vector V constructed by equation 10, above, is used to form W−Y and project it onto the subspace formed by the basis determination step 4, above. Since the basis determination step 4 has been orthogonalized, this projection can be carried out by forming a matrix E whose columns are the basis vectors E[j] from step 4, and multiplying by [W−V] on the left. Call the result of this projection U:

$$U = E \times [W - Y] \quad \text{Eq. 16}$$

7) Next the projected point U of the step 6 is moved to the nearest integral solution by rounding the last K−1 through 2K coordinates to the nearest integer and then changing the first K−2 coordinates by using back substitution in the matrix of step 2, above. Then U is updated to U+Y so it now satisfies Eq. 17.

$$Q - P = D \times U \quad \text{Eq. 17}$$

8) If the point obtained in step 7 satisfies the inequalities of Eq. 18, below, then the processing is completed.

$$0 \leq U[i] \leq B[i] \text{ for } i = 1, 2K \quad \text{Eq. 18}$$

Otherwise the method continues to step 9.

9) Point U of step 7 is moved into the 2K dimensional rectangle given by the inequalities of Eq. 18. This is done by devising a distance function Dist(U) that tells how far the point U is from the rectangle. Dist(U) is calculated as follows:

For every coordinate of U that is out of range, the absolute value of the difference between the coordinate and the closest in-range value is summed. The source code for such a function is as shown in code segment 10 below.

```
/* Code segment 10 */
float Dist(U) intergerU[];
{
int i;
int dist;
dist = 0;
    for (i=1; i <= K+1; i = i+ 1) {
        if (U[i] > B[i]) dist = dist + U[i] − B[i];
        if (U[i] < 0) dist = dist − U[i];
    }
return dist;
}
```

Once Dist (U) is implemented, the method cycles through the subspace basis generated in step 3 which is integral. If adding or subtracting the basis vector to U will reduce the distance, then U is updated in this manner. If not the next basis vector is tried. The process continues until the resulting U has a Dist (U) of 0, or the addition (subtraction) of any basis vector does not decrease Dist (U). The source code for such a sequence of perturbations is as shown below in code segment 11.

```
/* Code segment 11*/
int curDist, newDist;
int newU1[100], newU2[100];
curDist = Dist(U);
do {
    int i;
    oldDist = curDist;
    for (i=1; i<=K+1; i = i + 1) {
        newU1 = U + F[i];
        newU2 = U − F[i];
        newDist = Dist(newU1);
        if (newDist ==0 || newDist < curDist) {
            curDist = newDist;
            U = newU1;
        }
        newDist = Dist(newU2);
        if (newDist == 0 || newDist < curDist) {
            curDist = newDist;
            U = newU2;
        }
    }
} while (curDist > 0 && curDist < oldDist);
```

The vectors, which are represented by arrays in the code, are added in the above example using simply a +operator. While this is not officially defined in the C-language, this notation is used informally to mean that each element of the vectors is added componentwise. Also, the integral basis from step 3 is referred to as F[i], with ranges from 1 to K+1. In step 3, this basis was defined as F[j] where j ranged from K to 2K, but one skilled in the art can see how we could have just as easily been defined in the manner used in the above code example.

When the above code terminates, the variable U[s] will contain the correct number of boundary pixels to assign to the ideal cell to the right of a vertically oriented Side s. The remaining boundary pixels overlapping Side s are assigned to the ideal cell to the left Side s. In the case of a horizontally oriented Side s the variable U[s] will contain the correct number of boundary pixels to assign to the ideal cell above the Side s and the remaining boundary pixels overlapping the Side s are assigned to the ideal cell below Side s.

At the conclusion of this nine-step computing process of the forth embodiment of the invention, the best possible solution according to the second method is presented, given the original choice for the ideal sizes Q[c]. Extra R pixels discussed in Eq. 5 could be distributed differently to give another vector Q, which in turn could bring about a closer solution U. Thus, a further variation of the forth embodiment can be practiced where the fourth embodiment is run to completion several times with different values of Q. The best of the solutions thus generated may be chosen to be the output.

After any of the four embodiments described above of the method of the invention have completed processing, each boundary pixel 111 will have been assigned to an ideal cell 120. As was mentioned above, all interior pixels 114 will have been assigned to the ideal cell 120 in which they are totally within. Thus all generic pixels 110 will have been assigned to exactly one ideal cell 120. The set of generic pixels 110 assigned to a given ideal cell 120, called c is the digital cell 130, called c′, the computation of which is the object of present invention.

The preferred embodiments of the invention have now been described. Various substitutions and alternatives will be apparent to persons skilled in the art. It is therefore not intended that the invention be limited to the described embodiments, but only as defined by the claims which follow.

What is claimed is:

1. A method for dividing pixels in a supertile made up of a plurality of pixels into digital halftone cells which approximate ideal halftone cells, comprising:

superimposing a halftone grid made up of ideal halftone cells on said supertile;

assigning to said digital halftone cell a first group of pixels of said supertile, each of which is located entirely within a single ideal halftone cell;

assigning to said digital halftone cell a second group of pixels of said supertile, a portion of each of which lies in said ideal halftone cell and a portion of which lies in at least one other ideal halftone cell;

said assignments being made in a manner so that the area of said digital halftone cell, which contains the assigned first and second groups of pixels, will closely approximate the area of said ideal halftone cell.

2. A method for dividing pixels in a supertile made up of a plurality of pixels into digital halftone cells which approximate ideal halftone cells, comprising:

superimposing a halftone grid made up of ideal halftone cells on said supertile;

assigning to said digital halftone cell a first group of pixels of said supertile, each of which is located entirely within a single ideal halftone cell;

assigning to said digital halftone cell a second group of pixels of said supertile, a portion of each of which lies in said ideal halftone cell and a portion of each of which lies in at least two other ideal halftone cells, said second group being the pixels having the largest portion of their area lying in said ideal halftone cell;

assigning to said digital halftone cell a third group of pixels of said supertile, a portion of each of which lies in said ideal halftone cell and the remainder of each of which lies in a single other ideal halftone cell;

said assignments being made in a manner so that the area of said digital halftone cell, which contains the assigned first, second and third groups of pixels, will closely approximate the area of said ideal halftone cell.

3. The method of claim 1 wherein said interim digital halftone cell is first set equal to said ideal halftone cell.

4. The method of claim 1 wherein said predetermined number of pixels is one or less.

5. The method of claim 4 wherein said predetermined number of pixels is one-half.

6. The method of claim 1 wherein the assignment of pixels to said third group of pixels for each of a plurality of ideal halftone cells is done in a predetermined order of ideal halftone cells.

7. The method of claim 1 wherein said pixels being assigned to said third group of pixels are selected in a predetermined order.

8. A method for dividing pixels in a supertile made up of a plurality of pixels into digital halftone cells which approximate ideal halftone cells, comprising:

superimposing a halftone grid made up of ideal halftone cells on said supertile;

assigning to said digital halftone cell a first group of pixels of said supertile, each of which are located entirely within a single ideal halftone cell;

assigning to said digital halftone cell a second group of pixels of said supertile, a portion of each of which lies in said ideal halftone cell and a portion of which lies in at least one other ideal halftone cell;

said assignments being made simultaneously for a plurality of halftone cells, in a manner so that the area of each of said digital halftone cells, which contains the assigned first and second groups of pixels, will be approximately the same.

9. A method for dividing pixels in a supertile made up of a plurality of pixels into digital halftone cells which approximate ideal halftone cells, comprising:

superimposing a halftone grid made up of ideal halftone cells on said supertile;

assigning to each said digital halftone cell a first group of pixels of said supertile, each of which are located entirely within a single ideal halftone cell;

assigning to each said digital halftone cell a second group of pixels of said supertile, a portion of each of which lies in said ideal halftone cell and a portion of each of which lies in at least two other ideal halftone cells;

assigning to each said digital halftone cell a third group of pixels of said supertile, a portion of each of which lies in said ideal halftone cell and the remainder of each of which lies in a single other ideal halftone cell, said third group being selected, pixel by pixel, so that the area of each pixel which lies outside of said ideal halftone cell, when added to the area of an interim digital halftone cell with the pixels then contained, does not increase the area of said interim digital halftone cell over the area of said ideal halftone cell by more than a predetermined number of pixels;

said assignments being made simultaneously for a plurality of digital halftone cells, in a manner so that the area of each of said digital halftone cells, which contains the assigned first and second and a third groups of pixels, will be approximately the same.

10. The method of claim 9 wherein pixels of said third group are sorted by the incremental order of their x coordinates or their y coordinates, they are assigned to said ideal cell in accordance with that order.

11. The method of claim 10 wherein said halftone grid x coordinates include all points on parallel lines to said halftone grid's x axis that lie between or equal to −45° and +45° angles relative to the x axis of the grid that defines said pixels.

12. The method of claim 1 where said supertile includes:

a) whole and divided digital halftone cells;
b) equivalent ideal cells; and
c) whole and divided ideal cells.

13. The method of claim 12 wherein each of said whole or divided ideal cells is assigned to an equivalent ideal cell in a set including only whole ideal cells.

14. The method of claim 13 wherein each of said equivalent ideal cells is assigned a unique identifying number in incremental order and where said pixels are assigned to said equivalent ideal cells according to their incremental identifying number.

15. The method of claim 1 where, said pixel assignment to said ideal cell is accomplished one pixel at a time so that an area error variable is used to measure the difference between the area of said digital halftone cell and its associated ideal cell;

said area error variables being used so that the decision to add a pixel to said digital halftone cell is made in a manner which keeps said area error variables in the range of numbers obtained by multiplying the area of one pixel by a fraction between $-\frac{1}{2}$ and less than $+\frac{1}{2}$.

16. The method of claim 15 where said first group of pixels are first assigned to their associated digital halftone cell before the steps of claim 15 is performed.

17. A method for dividing pixels in a supertile made up of a plurality of pixels into digital halftone cells which approximate ideal cells, comprising:

superimposing a halftone grid made up of K ideal halftone cells on said supertile wherein said ideal cells collectively having a total of S sides which include vertical sides and horizontal sides, each of said S sides being shared between two adjacent cells;

each of said digital halftone cells includes Q[k] number of pixels to be obtained where Q[k] is a vector of K integers;

each of said S sides overlies B[s] number of boundary pixels, where B[s] is a vector of S integers;

each ideal cell includes a total of P[k] number of pixels after the assignment of said B[s] boundary pixels which if adjacent to a vertical side are assigned to the left of that side, and if adjacent to a horizontal side, are assigned below that side, where P[k] is a vector of K integers;

where the relationship between sides and ideal cells in the supertile is described by an incidence matrix D; and obtaining the initial number of boundary pixels V[s] that are to be finally moved into the ideal cell to the right of a vertical side or above a horizontal side by simultaneously solving the linear equation $D \times V = Q - P$ and the inequalities $0 \leq V[s] \leq B[s]$, whereby, when these V[s] pixels are actually moved the desired numbers of pixels per digital halftone cell Q[k] is obtained.

18. A method for dividing pixels in a supertile made up of a plurality of pixels into digital halftone cells which approximate ideal cells, comprising:

superimposing a halftone grid made up of K ideal halftone cells on said supertile wherein said ideal cells collectively having a total of S sides which include vertical sides and horizontal sides, each of said S sides being shared between two adjacent cells;

each of said digital halftone cells includes Q[k] number of pixels to be obtained where Q[k] is a vector of K integers;

each of said S sides overlies B[s] number of boundary pixels, where B[s] is a vector of S integers;

each ideal cell includes a total of P[k] number of pixels after the assignment of said B[s] boundary pixels which if adjacent to a vertical side are assigned to the right of that side, and if adjacent to a horizontal side, are assigned above that side, where P[k] is a vector of K integers;

where the relationship between sides and ideal cells in the supertile is described by an incidence matrix D; and obtaining the initial number of boundary pixels V[s] that are to be finally moved into the ideal cell to the left of a vertical side or below a horizontal side by simultaneously solving the linear equation $D \times V = Q - P$ and the inequalities $0 \leq V[s] \leq B[s]$, whereby, when these V[s] pixels are actually moved the desired numbers of pixels per digital halftone cell Q[k] is obtained.

19. A method for dividing pixels in a supertile made up of a plurality of pixels into digital halftone cells which approximate ideal cells, comprising:

superimposing a halftone grid made up of K ideal halftone cells on said supertile wherein said ideal cells collectively having a total of S sides which include vertical sides and horizontal sides, each of said S sides being shared between two adjacent cells;

each of said digital halftone cells includes Q[k] number of pixels to be obtained where Q[k] is a vector of K integers;

each of said S sides overlies B[s] number of boundary pixels, where B[s] is a vector of S integers;

each ideal cell includes a total of P[k] number of pixels after the assignment of said B[s] boundary pixels which if adjacent to a vertical side are assigned to the right of that side, and if adjacent to a horizontal side, are assigned below that side, where P[k] is a vector of K integers;

where the relationship between sides and ideal cells in the supertile is described by an incidence matrix D; and obtaining the initial number of boundary pixels V[s] that are to be finally moved into the ideal cell to the left of a vertical side or above a horizontal side by simultaneously solving the linear equation $D \times V = Q - P$ and the inequalities $0 \leq V[s] \leq B[s]$, whereby, when these V[s] pixels are actually moved the desired numbers of pixels per digital halftone cell Q[k] is obtained.

20. A method for dividing pixels in a supertile made up of a plurality of pixels into digital halftone cells which approximate ideal cells, comprising:

superimposing a halftone grid made up of K ideal halftone cells on said supertile wherein said ideal cells collectively having a total of S sides which include vertical sides and horizontal sides, each of said S sides being shared between two adjacent cells;

each of said digital halftone cells includes Q[k] number of pixels to be obtained where Q[k] is a vector of K integers;

each of said S sides overlies B[s] number of boundary pixels, where B[s] is a vector of S integers;

each ideal cell includes a total of P[k] number of pixels after the assignment of said B[s] boundary pixels which if adjacent to a vertical side are assigned to the left of that side, and if adjacent to a horizontal side, are assigned above that side, where P[k] is a vector of K integers;

where the relationship between sides and ideal cells in the supertile is described by an incidence matrix D; and obtaining the initial number of boundary pixels V[s] that are to be finally moved into the ideal cell to the right of a vertical side or below a horizontal side by simultaneously solving the linear equation $D \times V = Q - P$ and the inequalities $0 \leq V[s] \leq B[s]$, whereby, when these V[s] pixels are actually moved the desired numbers of pixels per digital halftone cell Q[k] is obtained.

21. The method of claim 17, 18, 19 or 20 wherein said incidence matrix D[c,s] between sides and ideal cells in the supertile is defined as:

D[c,s]=0 if a given side s is not incident to cell c or 1 if a given side s is to the right or above cell c or $=-1$ if a given side s is to the left or below cell c.

* * * * *

UNITED STATES PATENT AND TRADEMARK OFFICE
CERTIFICATE OF CORRECTION

PATENT NO. : 5,285,291                              Page 1 of 2
DATED      : February 8, 1994
INVENTOR(S): Schiller It is certified that error appears in the above-indentified patent and that said Letters Patent is hereby corrected as shown below:

| | | |
|---|---|---|
| Col. 05, line 24 | move "u=x*d11+y*d12;" to line 25 | |
| Col. 06, line 15 | delete ""x"" | insert --"sx"-- |
| Col. 08, line 50 | delete hard return after "each" | insert --ideal-- |
| Col. 11, line 64 | before "1" (at the far right) | insert --Eq.-- |
| Col. 12, line 03 | after "C2" and before "and" | insert a space |
| Col. 12, line 13 | after "(x,y" and before the period | insert --)-- |
| Col. 15, line 36 | delete ">" | insert --<-- |
| Col. 15, line 39 | delete ">" | insert --<-- |
| Col. 15, line 49 | delete the space between "SortBy" and "Coordinates" | insert a space between "Coordinates" and "(byList" |
| Col. 15, line 50 | after "0" delete "," | insert --;-- |
| Col. 15, line 50 | delete ">" | insert --<-- |
| Col. 15, line 67 | delete "variable" | insert --variables-- |
| Col. 16, line 16 | after "+½" | insert --, -- |
| Col. 17, line 54 | delete ">" | insert --<-- |
| Col. 17, line 55 | delete ">" | insert --<-- |
| Col. 18, line 52 | delete "man" | insert --many-- |
| Col. 19, line 58 | delete "(" | insert --{-- |
| Col. 20, line 44 | after "or" and before "value" | insert --subtract in order to bring it up to the correct predetermined-- |
| Col. 23, line 37 | delete "o" | insert --0-- |
| Col. 23, line 52 | delete "[]" | insert --[ ]-- |
| Col. 25, line 31 | delete "is" | insert --are-- |

UNITED STATES PATENT AND TRADEMARK OFFICE
CERTIFICATE OF CORRECTION

PATENT NO. : 5,285,291  
DATED : February 8, 1994  
INVENTOR(S) : Schiller

It is certified that error appears in the above-indentified patent and that said Letters Patent is hereby corrected as shown below:

Col. 28, line 61      before "1"      insert --=--

Signed and Sealed this

Twenty-seventh Day of September, 1994

Attest:

BRUCE LEHMAN

Attesting Officer     Commissioner of Patents and Trademarks